United States Patent
Giglia et al.

(10) Patent No.: US 12,059,644 B2
(45) Date of Patent: Aug. 13, 2024

(54) FILTER STRUCTURE WITH ENHANCED DIRT HOLDING CAPACITY

(71) Applicant: EMD Millipore Corporation, Burlington, MA (US)

(72) Inventors: Sal Giglia, Bedford, MA (US); David Nhiem, Lowell, MA (US); Sherry Ashby Leon, Leominster, MA (US); Gabriel Tkacik, Bedford, MA (US)

(73) Assignee: EMD Millipore Corporation, Burlington, MA (US)

( * ) Notice: Subject to any disclaimer, the term of this patent is extended or adjusted under 35 U.S.C. 154(b) by 0 days.

(21) Appl. No.: 15/301,781

(22) PCT Filed: Jun. 23, 2015

(86) PCT No.: PCT/US2015/037055
§ 371 (c)(1),
(2) Date: Oct. 4, 2016

(87) PCT Pub. No.: WO2015/200239
PCT Pub. Date: Dec. 30, 2015

(65) Prior Publication Data
US 2017/0173509 A1    Jun. 22, 2017

Related U.S. Application Data
(60) Provisional application No. 62/017,463, filed on Jun. 26, 2014.

(51) Int. Cl.
*B01D 39/16* (2006.01)

(52) U.S. Cl.
CPC .... *B01D 39/1623* (2013.01); *B01D 2239/025* (2013.01); *B01D 2239/0631* (2013.01); *B01D 2239/065* (2013.01)

(58) Field of Classification Search
CPC ...... B01D 2239/025; B01D 2239/0631; B01D 2239/065; B01D 39/1623; B01D 39/02
See application file for complete search history.

(56) References Cited

U.S. PATENT DOCUMENTS
500,167 A    6/1893   Wong et al.
552,291 A   12/1895   Keefer
(Continued)

FOREIGN PATENT DOCUMENTS
CN   2390670 Y    8/2000
CN   1460534 A   12/2003
(Continued)

OTHER PUBLICATIONS
Dotti F, Varesano A, Montarsolo A, Aluigi A, Tonin C, Mazzuchetti G. Electrospun Porous Mats for High Efficiency Filtration. Journal of Industrial Textiles. 2007;37(2):151-162. doi:10.1177/1528083707078133 2007 (Year: 2007).*
(Continued)

*Primary Examiner* — Chester T Barry
(74) *Attorney, Agent, or Firm* — EMD Millipore Corporation

(57) ABSTRACT

A fluid filtration device containing a composite filter media having a coarse porous polymeric nonwoven interlayer located between first and second polymeric fiber containing filter mats. The fiber diameters of the fibers in the first and second filter mats are different from each other, and each filter mat has a different pore size rating. The first and second polymeric fibers in the filter mats can be electrospun nanofibers. The interlayer has a coarser pore size when compared to the either the first or second filter mats, such that the resulting composite media has an increased dirt holding
(Continued)

capacity compared to filter layers that are layered directly over each other without the presence of a coarse interlayer therebetween.

15 Claims, 6 Drawing Sheets

(56) References Cited

U.S. PATENT DOCUMENTS

| | | |
|---|---|---|
| 692,631 A | 2/1902 | Cooley |
| 705,691 A | 7/1902 | Morton |
| 1,699,615 A | 1/1929 | Hagiwara |
| 1,975,504 A | 10/1934 | Formhals |
| 1,975,594 A | 10/1934 | Stroud et al. |
| 2,048,651 A | 7/1936 | Norton |
| 2,158,415 A | 5/1939 | Formhals |
| 2,158,416 A | 5/1939 | Formhals |
| 2,160,962 A | 6/1939 | Formhals |
| 2,168,027 A | 8/1939 | Gladding |
| 2,349,950 A | 5/1944 | Formhals |
| 3,585,126 A | 6/1971 | Cannon et al. |
| 3,620,970 A | 11/1971 | Klug et al. |
| 3,864,289 A | 2/1975 | Rendall |
| 3,876,738 A | 4/1975 | Marinaccio et al. |
| 3,994,258 A | 11/1976 | Simm |
| 4,043,331 A | 8/1977 | Martin et al. |
| 4,069,026 A | 1/1978 | Simm et al. |
| 4,127,706 A | 11/1978 | Martin et al. |
| 4,143,196 A | 3/1979 | Simm et al. |
| 4,261,834 A | 4/1981 | deWinter |
| 4,323,525 A | 4/1982 | Bornat |
| 4,510,047 A | 4/1985 | Thompson |
| 4,604,326 A | 8/1986 | Manabe et al. |
| 4,629,563 A | 12/1986 | Wrasidlo |
| 4,650,506 A | 3/1987 | Barris et al. |
| 4,657,793 A | 4/1987 | Fisher |
| 4,704,324 A | 11/1987 | Davis et al. |
| 4,717,498 A | 1/1988 | Maxon |
| 4,778,601 A | 10/1988 | Lopatin et al. |
| 4,824,568 A | 4/1989 | Allegrezza et al. |
| 4,839,203 A | 6/1989 | Davis et al. |
| 4,849,127 A | 7/1989 | Maxon |
| 4,853,129 A | 8/1989 | Wan |
| 4,938,869 A | 7/1990 | Bayerlein et al. |
| 4,983,268 A | 1/1991 | Kirkpatrick et al. |
| 4,983,288 A | 1/1991 | Karbachsch et al. |
| 5,096,473 A | 3/1992 | Sassa et al. |
| 5,228,994 A | 7/1993 | Tkacik et al. |
| 5,238,106 A | 8/1993 | Nguyen et al. |
| 5,238,568 A | 8/1993 | Fely et al. |
| 5,248,424 A | 9/1993 | Cote et al. |
| 5,264,165 A | 11/1993 | Knight |
| 5,283,106 A | 2/1994 | Seiler et al. |
| 5,435,957 A | 7/1995 | Degen et al. |
| 5,500,167 A | 3/1996 | Degen |
| 5,507,847 A | 4/1996 | George et al. |
| 5,522,601 A | 6/1996 | Murphy |
| 5,522,991 A | 6/1996 | Tuccelli et al. |
| 5,536,413 A | 7/1996 | Bormann et al. |
| 5,620,790 A | 4/1997 | Holzki et al. |
| 5,652,050 A | 7/1997 | Pall et al. |
| 5,672,399 A | 9/1997 | Kahlbaugh et al. |
| 5,693,231 A | 12/1997 | Johnson et al. |
| 5,731,164 A | 3/1998 | Becker et al. |
| 5,739,316 A | 4/1998 | Beer et al. |
| 5,846,438 A | 12/1998 | Pall et al. |
| 5,968,650 A | 10/1999 | Tennent et al. |
| 5,985,112 A | 11/1999 | Fischer |
| 6,045,899 A | 4/2000 | Wang et al. |
| 6,074,869 A | 6/2000 | Pall et al. |
| 6,113,794 A | 9/2000 | Kumar et al. |
| 6,143,675 A | 11/2000 | McCollam et al. |
| 6,153,098 A | 11/2000 | Bayerlein et al. |
| 6,315,805 B1 | 11/2001 | Strauss |
| 6,321,915 B1 | 11/2001 | Wilson et al. |
| 6,464,881 B2 | 10/2002 | Thoraval |
| 6,513,666 B2 | 2/2003 | Meyering et al. |
| 6,554,881 B1 | 4/2003 | Healey |
| 6,598,749 B2 | 7/2003 | Paul et al. |
| 6,604,925 B1 | 8/2003 | Dubson |
| 6,616,435 B2 | 9/2003 | Lee et al. |
| 6,713,011 B2 | 3/2004 | Chu et al. |
| 6,743,273 B2 | 6/2004 | Chung et al. |
| 6,746,517 B2 | 6/2004 | Benson et al. |
| 6,770,204 B1 | 8/2004 | Koslow |
| 6,796,169 B2 | 9/2004 | Makino et al. |
| 6,797,169 B1 | 9/2004 | Ide et al. |
| 6,835,311 B2 | 12/2004 | Koslow |
| 6,858,057 B2 | 2/2005 | Healey |
| 6,866,704 B2 | 3/2005 | Koslow |
| 6,866,794 B1 | 3/2005 | Zhang et al. |
| 6,872,311 B2 | 3/2005 | Koslow |
| 6,913,154 B2 | 7/2005 | Koslow |
| 6,924,028 B2 | 8/2005 | Chung et al. |
| 6,953,604 B2 | 10/2005 | Koslow |
| 6,955,775 B2 | 10/2005 | Chung et al. |
| 6,959,820 B2 | 11/2005 | Koslow |
| 6,974,490 B2 | 12/2005 | Gillingham et al. |
| 6,994,811 B2 | 2/2006 | Kools |
| 6,998,058 B2 | 2/2006 | Koslow |
| 7,008,465 B2 | 3/2006 | Graham et al. |
| 7,008,537 B2 | 3/2006 | Koslow |
| 7,070,640 B2 | 7/2006 | Chung et al. |
| 7,070,836 B2 | 7/2006 | Czado |
| 7,090,712 B2 | 8/2006 | Gillingham et al. |
| 7,090,715 B2 | 8/2006 | Chung et al. |
| 7,097,694 B1 | 8/2006 | Jaroszczyk et al. |
| 7,105,228 B2 | 9/2006 | Averdung et al. |
| 7,108,791 B2 | 9/2006 | Tkacik et al. |
| 7,109,136 B2 | 9/2006 | Senecal et al. |
| 7,115,150 B2 | 10/2006 | Johnson et al. |
| 7,144,533 B2 | 12/2006 | Koslow |
| 7,179,317 B2 | 2/2007 | Chung et al. |
| 7,229,665 B2 | 6/2007 | Kools |
| 7,235,122 B2 | 6/2007 | Bryner et al. |
| 7,270,692 B2 | 9/2007 | Gillingham et al. |
| 7,270,693 B2 | 9/2007 | Chung et al. |
| 7,318,853 B2 | 1/2008 | Chung et al. |
| 7,341,663 B2 * | 3/2008 | Offeman ............... B01D 61/246 210/321.6 |
| 7,378,020 B2 | 5/2008 | Ieraci et al. |
| 7,419,601 B2 | 9/2008 | Cooper et al. |
| 7,459,085 B2 | 12/2008 | Koguma et al. |
| 7,470,639 B2 | 12/2008 | Angelini et al. |
| 7,555,195 B2 | 6/2009 | Yamashita et al. |
| 7,585,437 B2 | 9/2009 | Jirsak et al. |
| 7,743,929 B2 | 6/2010 | Kools |
| 7,789,930 B2 | 9/2010 | Ensor et al. |
| 7,790,135 B2 | 9/2010 | Lennhoff |
| 7,875,380 B2 | 1/2011 | Chun et al. |
| 7,927,885 B2 | 4/2011 | Nishita |
| 7,993,523 B2 | 8/2011 | Chen et al. |
| 7,993,567 B2 | 8/2011 | Scott-Carnell et al. |
| 8,002,990 B2 | 8/2011 | Schroeder et al. |
| 8,038,013 B2 | 10/2011 | Chen et al. |
| 8,222,166 B2 | 7/2012 | Chu et al. |
| 8,282,712 B2 | 10/2012 | Chi et al. |
| 8,361,180 B2 | 1/2013 | Lim et al. |
| 8,366,797 B2 | 2/2013 | Chung et al. |
| 8,679,217 B2 | 3/2014 | Chi et al. |
| 8,689,985 B2 | 4/2014 | Bates, III et al. |
| 8,906,447 B2 | 12/2014 | Zhamu et al. |
| 9,174,152 B2 | 11/2015 | Dai et al. |
| 9,180,393 B2 | 11/2015 | Chen et al. |
| 9,272,247 B2 | 3/2016 | Qi et al. |
| 9,623,352 B2 | 4/2017 | Kas et al. |
| 9,750,829 B2 | 9/2017 | Kozlov et al. |
| 9,889,214 B2 | 2/2018 | Kozlov et al. |
| 9,943,616 B2 | 4/2018 | Kozlov et al. |
| 10,064,965 B2 | 9/2018 | Kozlov et al. |
| 10,252,199 B2 | 4/2019 | Kas et al. |
| 10,633,766 B2 | 4/2020 | Haff et al. |
| 10,675,588 B2 | 6/2020 | Cataldo et al. |
| 10,722,602 B2 | 7/2020 | Kozlov et al. |

(56) References Cited

U.S. PATENT DOCUMENTS

| | | |
|---|---|---|
| 11,154,821 B2 | 10/2021 | Kas et al. |
| 2002/0046656 A1 | 4/2002 | Benson et al. |
| 2002/0084178 A1 | 7/2002 | Dubson et al. |
| 2002/0096246 A1 | 7/2002 | Sennet et al. |
| 2002/0100725 A1 | 8/2002 | Lee et al. |
| 2002/0117439 A1 | 8/2002 | Paul et al. |
| 2002/0124953 A1 | 9/2002 | Sennett et al. |
| 2002/0175124 A1 | 11/2002 | Tkacik et al. |
| 2003/0010002 A1 | 1/2003 | Johnson et al. |
| 2003/0026985 A1 | 2/2003 | Greiner et al. |
| 2003/0106294 A1* | 6/2003 | Chung ............... B01D 39/086 55/486 |
| 2003/0121844 A1 | 7/2003 | Koo et al. |
| 2003/0137083 A1 | 7/2003 | Ko et al. |
| 2003/0177909 A1 | 9/2003 | Koslow |
| 2003/0213218 A1 | 11/2003 | Dubson |
| 2003/0213744 A1 | 11/2003 | Kools et al. |
| 2004/0017011 A1 | 1/2004 | Narita et al. |
| 2004/0036014 A1 | 2/2004 | Simon |
| 2004/0038013 A1 | 2/2004 | Schaefer et al. |
| 2004/0038014 A1 | 2/2004 | Schaefer et al. |
| 2004/0070118 A1 | 4/2004 | Czado |
| 2004/0080083 A1 | 4/2004 | Czado |
| 2004/0116025 A1 | 6/2004 | Gogins et al. |
| 2004/0118770 A1 | 6/2004 | Sale et al. |
| 2004/0159609 A1 | 8/2004 | Chase |
| 2004/0206693 A1 | 10/2004 | Charkoudian et al. |
| 2004/0206694 A1 | 10/2004 | Charkoudian |
| 2004/0207126 A1 | 10/2004 | Czado |
| 2004/0255783 A1 | 12/2004 | Graham et al. |
| 2005/0008707 A1* | 1/2005 | Hovey ............... A61K 9/5138 424/489 |
| 2005/0026526 A1 | 2/2005 | Verdegan et al. |
| 2005/0048274 A1 | 3/2005 | Rabolt et al. |
| 2005/0051487 A1 | 3/2005 | Koslow |
| 2005/0053782 A1 | 3/2005 | Sen et al. |
| 2005/0067732 A1 | 3/2005 | Kim et al. |
| 2005/0073075 A1 | 4/2005 | Chu et al. |
| 2005/0123688 A1 | 6/2005 | Craighead et al. |
| 2005/0142973 A1 | 6/2005 | Bletsos et al. |
| 2005/0163955 A1 | 7/2005 | Schaefer et al. |
| 2005/0210844 A1* | 9/2005 | Kahlbaugh ........... B01D 27/06 55/486 |
| 2005/0235619 A1 | 10/2005 | Heinz et al. |
| 2005/0247236 A1 | 11/2005 | Frey et al. |
| 2005/0260381 A1 | 11/2005 | Ditter et al. |
| 2005/0272925 A1 | 12/2005 | Charkoudian et al. |
| 2006/0016748 A1 | 1/2006 | Koguma et al. |
| 2006/0053782 A1 | 3/2006 | Kobayashi et al. |
| 2006/0057377 A1 | 3/2006 | Harrison et al. |
| 2006/0060519 A1 | 3/2006 | Tkacik et al. |
| 2006/0068668 A1 | 3/2006 | Kameoka et al. |
| 2006/0084340 A1 | 4/2006 | Bond et al. |
| 2006/0084341 A1 | 4/2006 | Bodaghi et al. |
| 2006/0086657 A1 | 4/2006 | Kools |
| 2006/0094320 A1 | 5/2006 | Chen et al. |
| 2006/0096912 A1 | 5/2006 | Nussbaumer et al. |
| 2006/0097431 A1 | 5/2006 | Hovanec |
| 2006/0135020 A1 | 6/2006 | Weinberg et al. |
| 2006/0137317 A1 | 6/2006 | Bryner et al. |
| 2006/0137318 A1 | 6/2006 | Lim et al. |
| 2006/0138710 A1 | 6/2006 | Bryner et al. |
| 2006/0138711 A1 | 6/2006 | Bryner et al. |
| 2006/0144782 A1 | 7/2006 | Buck |
| 2006/0149561 A1 | 7/2006 | Govender |
| 2006/0151094 A1 | 7/2006 | Angelini et al. |
| 2006/0160064 A1 | 7/2006 | Carbonell |
| 2006/0186031 A1* | 8/2006 | Fick ............... B01D 29/21 210/235 |
| 2006/0213829 A1 | 9/2006 | Rutledge et al. |
| 2006/0230731 A1 | 10/2006 | Kalayci et al. |
| 2006/0242933 A1* | 11/2006 | Webb ............... B01D 46/521 55/486 |
| 2006/0246798 A1 | 11/2006 | Reneker et al. |
| 2006/0264139 A1 | 11/2006 | Czado |
| 2006/0264140 A1 | 11/2006 | Andrady et al. |
| 2006/0286446 A1 | 12/2006 | Chun et al. |
| 2006/0286886 A1 | 12/2006 | Komura et al. |
| 2006/0290031 A1 | 12/2006 | Jirsak et al. |
| 2006/0293116 A1 | 12/2006 | Hocknell et al. |
| 2006/0293169 A1 | 12/2006 | Srinivasan et al. |
| 2007/0009736 A1 | 1/2007 | Chuang et al. |
| 2007/0018361 A1 | 1/2007 | Xu |
| 2007/0021021 A1 | 1/2007 | Verdegan et al. |
| 2007/0040305 A1 | 2/2007 | Armantrout et al. |
| 2007/0042069 A1 | 2/2007 | Armantrout et al. |
| 2007/0062855 A1 | 3/2007 | Chase et al. |
| 2007/0074628 A1 | 4/2007 | Jones et al. |
| 2007/0075015 A1 | 4/2007 | Bates et al. |
| 2007/0084786 A1 | 4/2007 | Smithies |
| 2007/0107399 A1* | 5/2007 | Schwandt .......... B01D 39/1623 55/528 |
| 2007/0113530 A1 | 5/2007 | Morozov et al. |
| 2007/0125700 A1 | 6/2007 | Ding et al. |
| 2007/0134151 A1 | 6/2007 | Jo et al. |
| 2007/0151921 A1 | 7/2007 | Nakano et al. |
| 2007/0163217 A1 | 7/2007 | Frey et al. |
| 2007/0175196 A1 | 8/2007 | Tepper et al. |
| 2007/0196401 A1 | 8/2007 | Naruse et al. |
| 2007/0240576 A1 | 10/2007 | von Blucher et al. |
| 2007/0298072 A1 | 12/2007 | Kitazono et al. |
| 2008/0004205 A1 | 1/2008 | Tkacik et al. |
| 2008/0004206 A1 | 1/2008 | Rosen et al. |
| 2008/0010959 A1 | 1/2008 | Gillingham et al. |
| 2008/0020192 A1 | 1/2008 | Yen et al. |
| 2008/0022024 A1 | 1/2008 | Mao |
| 2008/0026041 A1 | 1/2008 | Tepper et al. |
| 2008/0034967 A1 | 2/2008 | Ping |
| 2008/0060328 A1 | 3/2008 | Devine |
| 2008/0070463 A1 | 3/2008 | Arora et al. |
| 2008/0073296 A1 | 3/2008 | Dema et al. |
| 2008/0099398 A1 | 5/2008 | Hu et al. |
| 2008/0110342 A1 | 5/2008 | Ensor et al. |
| 2008/0110822 A1 | 5/2008 | Chung et al. |
| 2008/0134652 A1 | 6/2008 | Lim et al. |
| 2008/0136063 A1 | 6/2008 | Chuang et al. |
| 2008/0149561 A1* | 6/2008 | Chu ............... A61L 15/425 210/500.38 |
| 2008/0150192 A1 | 6/2008 | Perret et al. |
| 2008/0150197 A1 | 6/2008 | Chang et al. |
| 2008/0164214 A1 | 7/2008 | Lerner et al. |
| 2008/0207076 A1 | 8/2008 | Jirsak et al. |
| 2008/0213574 A1 | 9/2008 | McKee et al. |
| 2008/0217239 A1 | 9/2008 | Chen et al. |
| 2008/0217241 A1 | 9/2008 | Smithies et al. |
| 2008/0217807 A1 | 9/2008 | Lee et al. |
| 2008/0220241 A1 | 9/2008 | Abdelsalam et al. |
| 2008/0237934 A1 | 10/2008 | Reneker et al. |
| 2008/0242171 A1 | 10/2008 | Huang et al. |
| 2008/0264258 A1 | 10/2008 | Mares et al. |
| 2008/0264259 A1* | 10/2008 | Leung ............... B01D 39/1623 96/143 |
| 2008/0274312 A1 | 11/2008 | Schelling et al. |
| 2008/0284050 A1 | 11/2008 | Mares et al. |
| 2008/0302074 A1 | 12/2008 | Gebert et al. |
| 2009/0026137 A1 | 1/2009 | Chen et al. |
| 2009/0065436 A1 | 3/2009 | Kalayci et al. |
| 2009/0091065 A1 | 4/2009 | Katti et al. |
| 2009/0110873 A1 | 4/2009 | Jiang et al. |
| 2009/0199717 A1 | 8/2009 | Green et al. |
| 2009/0220241 A1 | 9/2009 | Katagiri et al. |
| 2010/0037576 A1* | 2/2010 | Claasen ............... D01F 6/82 55/528 |
| 2010/0096066 A1 | 4/2010 | Ramaswamy et al. |
| 2010/0139224 A1 | 6/2010 | Lim et al. |
| 2010/0173070 A1 | 7/2010 | Niu |
| 2010/0193428 A1 | 8/2010 | Hane et al. |
| 2010/0206803 A1* | 8/2010 | Ward ............... B01D 39/1623 210/491 |
| 2010/0222771 A1 | 9/2010 | Mitchell et al. |
| 2010/0226823 A1 | 9/2010 | Rakhman et al. |
| 2010/0316988 A1 | 12/2010 | Sehgal |

(56) References Cited

U.S. PATENT DOCUMENTS

| | | | |
|---|---|---|---|
| 2011/0124941 A1* | 5/2011 | Verdegan | B01D 17/0211 |
| | | | 585/818 |
| 2011/0163035 A1 | 7/2011 | Cheng et al. | |
| 2011/0168647 A1* | 7/2011 | Wieczorek | B01D 29/21 |
| | | | 210/799 |
| 2011/0198282 A1 | 8/2011 | Chu et al. | |
| 2011/0206973 A1 | 8/2011 | Brant et al. | |
| 2011/0233152 A1* | 9/2011 | Wieczorek | B01D 17/045 |
| | | | 210/799 |
| 2011/0240550 A1 | 10/2011 | Moore et al. | |
| 2011/0266213 A1 | 11/2011 | Jo et al. | |
| 2011/0305872 A1 | 12/2011 | Li et al. | |
| 2012/0061314 A1 | 3/2012 | Choi et al. | |
| 2012/0061332 A1 | 3/2012 | Kas et al. | |
| 2012/0091072 A1 | 4/2012 | Kozlov et al. | |
| 2012/0125847 A1 | 5/2012 | Sehgal | |
| 2012/0125866 A1* | 5/2012 | Fantini | D01F 6/52 |
| | | | 210/767 |
| 2013/0092622 A1 | 4/2013 | Kas et al. | |
| 2014/0061114 A1* | 3/2014 | Ramirez | B01D 69/12 |
| | | | 210/321.6 |
| 2014/0116945 A1 | 5/2014 | Kas et al. | |
| 2014/0227602 A1 | 8/2014 | Sumida et al. | |
| 2014/0284264 A1* | 9/2014 | Klein | B01D 29/58 |
| | | | 210/489 |
| 2015/0037055 A1 | 2/2015 | Kitagawa et al. | |
| 2015/0136693 A1 | 5/2015 | Hwang et al. | |
| 2015/0298070 A1 | 10/2015 | Koslov et al. | |
| 2015/0360157 A1 | 12/2015 | Hwang et al. | |
| 2016/0016124 A1 | 1/2016 | Zheng et al. | |
| 2016/0136558 A1 | 5/2016 | Zheng et al. | |
| 2016/0136584 A1 | 5/2016 | Hwang et al. | |
| 2016/0166961 A1* | 6/2016 | Haberkamp | B01D 39/18 |
| | | | 210/504 |
| 2016/0175748 A1 | 6/2016 | Park | |
| 2016/0193555 A1 | 7/2016 | Park | |
| 2016/0243478 A1 | 8/2016 | Park | |
| 2016/0361270 A1 | 12/2016 | Stoddard et al. | |
| 2017/0100912 A1 | 4/2017 | Tricoli et al. | |
| 2017/0173509 A1 | 6/2017 | Giglia et al. | |
| 2017/0173511 A1 | 6/2017 | Kas et al. | |
| 2017/0260652 A1 | 9/2017 | Kinoshita | |
| 2017/0360969 A1 | 12/2017 | Kozlov et al. | |
| 2018/0025842 A1 | 1/2018 | Muraoka et al. | |
| 2018/0085710 A1 | 3/2018 | Cataldo et al. | |
| 2018/0142379 A1 | 5/2018 | Poss et al. | |
| 2018/0159139 A1 | 6/2018 | Radacsi et al. | |
| 2019/0015533 A1 | 1/2019 | Kozlov et al. | |
| 2019/0292686 A1 | 9/2019 | Kimiya et al. | |
| 2019/0314746 A1 | 10/2019 | Leung | |
| 2020/0173076 A1 | 6/2020 | Cataldo et al. | |
| 2021/0180255 A1 | 6/2021 | Huang et al. | |
| 2021/0355606 A1 | 11/2021 | Kas et al. | |
| 2021/0403971 A1* | 12/2021 | Hira | C12P 21/02 |
| 2022/0018039 A1 | 1/2022 | Siheng et al. | |
| 2022/0168705 A1 | 6/2022 | Wong et al. | |
| 2022/0169779 A1 | 6/2022 | Noda et al. | |
| 2022/0243363 A1 | 8/2022 | Wong | |
| 2022/0281208 A1 | 9/2022 | Leung et al. | |
| 2022/0403097 A1 | 12/2022 | Noda et al. | |
| 2023/0123639 A1 | 4/2023 | Kozlov et al. | |

FOREIGN PATENT DOCUMENTS

| | | |
|---|---|---|
| CN | 1471421 A | 1/2004 |
| CN | 1625429 A | 6/2005 |
| CN | 1625434 A | 6/2005 |
| CN | 1942616 A | 4/2007 |
| CN | 101189368 A | 5/2008 |
| CN | 101272840 A | 9/2008 |
| CN | 101318090 A | 12/2008 |
| CN | 101534954 A | 9/2009 |
| CN | 101564656 A | 10/2009 |
| CN | 101653676 A | 2/2010 |
| CN | 102170950 A | 8/2011 |
| CN | 102227247 A | 10/2011 |
| CN | 102448508 A | 5/2012 |
| CN | 102917777 A | 2/2013 |
| CN | 103459006 A | 12/2013 |
| CN | 104321133 A | 1/2015 |
| CN | 104540531 A | 4/2015 |
| CN | 104906871 A | 9/2015 |
| CN | 105120991 A | 12/2015 |
| CN | 105377433 A | 3/2016 |
| CN | 106457079 A | 2/2017 |
| CN | 106480517 A | 3/2017 |
| DE | 19545701 C1 | 5/1997 |
| EP | 0257635 A2 | 3/1988 |
| EP | 0320033 A1 | 6/1989 |
| EP | 0497594 A1 | 8/1992 |
| EP | 0168783 B1 | 6/1994 |
| EP | 0781600 A2 | 7/1997 |
| EP | 1743975 A1 | 1/2007 |
| EP | 1745808 A1 | 1/2007 |
| EP | 1829603 A1 | 9/2007 |
| EP | 1878482 A1 | 1/2008 |
| EP | 1673493 B1 | 7/2009 |
| EP | 2174703 A1 | 4/2010 |
| EP | 2222385 B1 | 9/2010 |
| EP | 2323174 A2 | 5/2011 |
| EP | 2599908 A1 | 6/2013 |
| EP | 3279373 A1 | 2/2018 |
| GB | 1519070 A | 7/1978 |
| JP | S62-181797 A | 8/1987 |
| JP | 02-161954 A | 6/1990 |
| JP | 04-351645 A | 12/1992 |
| JP | 07-213876 A | 8/1995 |
| JP | 2000-61277 A | 2/2000 |
| JP | 2000-325764 A | 11/2000 |
| JP | 2004-28875 A | 1/2004 |
| JP | 2004351645 A | 12/2004 |
| JP | 2005-65647 A | 3/2005 |
| JP | 2005-515880 A | 6/2005 |
| JP | 2005-270965 A | 10/2005 |
| JP | 2005-333886 A | 12/2005 |
| JP | 2005-536347 A | 12/2005 |
| JP | 200682006 A | 3/2006 |
| JP | 2006-299459 A | 11/2006 |
| JP | 2006-326579 A | 12/2006 |
| JP | 2006-328562 A | 12/2006 |
| JP | 2006-336173 A | 12/2006 |
| JP | 2006-527911 A | 12/2006 |
| JP | 2006341233 A | 12/2006 |
| JP | 2007-075739 A | 3/2007 |
| JP | 2007-105724 A | 4/2007 |
| JP | 2007213876 A | 8/2007 |
| JP | 2007-301436 A | 11/2007 |
| JP | 2007-332342 A | 12/2007 |
| JP | 2008-502920 A | 1/2008 |
| JP | 200849239 A | 3/2008 |
| JP | 2008-162098 A | 7/2008 |
| JP | 2008-525195 A | 7/2008 |
| JP | 2008-190055 A | 8/2008 |
| JP | 2009-006272 A | 1/2009 |
| JP | 2009-509754 A | 3/2009 |
| JP | 200950851 A | 3/2009 |
| JP | 2009-127150 A | 6/2009 |
| JP | 2009-148748 A | 7/2009 |
| JP | 2009148746 A | 7/2009 |
| JP | 2009183879 A | 8/2009 |
| JP | 2009233550 A | 10/2009 |
| JP | 2010-000407 A | 1/2010 |
| JP | 2010-94962 A | 4/2010 |
| JP | 2011-122258 A | 6/2011 |
| JP | 2011-214168 A | 10/2011 |
| JP | 2011/529778 A | 12/2011 |
| JP | 2012-501518 A | 1/2012 |
| JP | 2012-520761 A | 9/2012 |
| JP | 2012-189355 A | 10/2012 |
| JP | 2012-523320 A | 10/2012 |
| JP | 2013-073618 A | 4/2013 |
| JP | 53-55828 B1 | 9/2013 |
| JP | 2013-236985 A | 11/2013 |

(56) References Cited

FOREIGN PATENT DOCUMENTS

| | | |
|---|---|---|
| JP | 2014-504951 A | 2/2014 |
| JP | 2014-514958 A | 6/2014 |
| JP | 2014208342 A | 11/2014 |
| JP | 2015-45114 A | 3/2015 |
| JP | 2015-183334 A | 10/2015 |
| JP | 59-31118 B2 | 5/2016 |
| JP | 2016-164319 A | 9/2016 |
| JP | 2017-506339 A | 3/2017 |
| JP | 2017-113884 A | 6/2017 |
| JP | 68-32889 B2 | 2/2021 |
| KR | 2002-0012674 A | 2/2002 |
| KR | 10-2005-0077304 A | 8/2005 |
| KR | 2005-0077304 A | 8/2005 |
| KR | 10-2006-0079211 A | 7/2006 |
| KR | 2006007921 A | 7/2006 |
| KR | 2007-0073851 A | 7/2007 |
| KR | 10-0871440 B1 | 12/2008 |
| KR | 10-2010-0023152 A | 3/2010 |
| KR | 10-2010-0037055 A | 4/2010 |
| SG | 185659 A1 | 12/2012 |
| WO | 97/20622 A1 | 6/1997 |
| WO | 1997/20622 A1 | 6/1997 |
| WO | 97/42835 A1 | 11/1997 |
| WO | WO-1999/016810 A1 | 4/1999 |
| WO | 00/05358 A1 | 2/2000 |
| WO | 2000/45933 A1 | 8/2000 |
| WO | WO-2000/056804 A1 | 9/2000 |
| WO | WO-2000/058388 A1 | 10/2000 |
| WO | 01/01047 A1 | 1/2001 |
| WO | 01/07599 A1 | 2/2001 |
| WO | 2001/014047 A1 | 3/2001 |
| WO | WO-01/14047 A1 | 3/2001 |
| WO | 2003/016601 A1 | 2/2003 |
| WO | WO-2003/037959 A1 | 5/2003 |
| WO | 2003/064013 A1 | 8/2003 |
| WO | WO-03/064013 A1 | 8/2003 |
| WO | 2003/080905 A1 | 10/2003 |
| WO | 2004/018079 A2 | 3/2004 |
| WO | 2004/112183 A1 | 12/2004 |
| WO | 2005/024101 A1 | 3/2005 |
| WO | WO-2005/073441 A1 | 8/2005 |
| WO | 2005/123952 A2 | 12/2005 |
| WO | WO-2006/016800 A1 | 2/2006 |
| WO | 2006/068100 A1 | 6/2006 |
| WO | 2006/131081 A1 | 12/2006 |
| WO | WO-2006/131061 A1 | 12/2006 |
| WO | 2007/001405 A2 | 1/2007 |
| WO | 2007/011477 A2 | 1/2007 |
| WO | 2007/041311 A2 | 4/2007 |
| WO | 2007/054039 A1 | 5/2007 |
| WO | 2007/054040 A2 | 5/2007 |
| WO | WO-2007/054050 A1 | 5/2007 |
| WO | 2007/054040 A3 | 8/2007 |
| WO | WO-2007/098889 A1 | 9/2007 |
| WO | 2007/111477 A1 | 10/2007 |
| WO | 2007/137530 A2 | 12/2007 |
| WO | WO-2007/144189 A2 | 12/2007 |
| WO | 2008/034190 A1 | 3/2008 |
| WO | 2008/073507 A2 | 6/2008 |
| WO | 2008/106903 A2 | 9/2008 |
| WO | 2008/109117 A1 | 9/2008 |
| WO | WO-2008/106803 A1 | 9/2008 |
| WO | WO-2008/142023 A2 | 11/2008 |
| WO | 2009/010020 A2 | 1/2009 |
| WO | 2009/017086 A1 | 2/2009 |
| WO | 2009/032040 A1 | 3/2009 |
| WO | 2009/064767 A2 | 5/2009 |
| WO | WO-2009/063067 A2 | 5/2009 |
| WO | WO-2009/064757 A1 | 5/2009 |
| WO | 2009/071909 A1 | 6/2009 |
| WO | 2009/119638 A1 | 10/2009 |
| WO | 2009/140385 A1 | 11/2009 |
| WO | 2010/042647 A2 | 4/2010 |
| WO | WO-2010/042706 A1 | 4/2010 |
| WO | WO-2010/049535 A1 | 5/2010 |
| WO | 2010/069296 A1 | 6/2010 |
| WO | 2010/107503 A1 | 9/2010 |
| WO | 2010/120668 A1 | 10/2010 |
| WO | WO-2010/127634 A1 | 11/2010 |
| WO | 2010/147763 A2 | 12/2010 |
| WO | 2011/019686 A1 | 2/2011 |
| WO | WO-2011/019686 A1 | 2/2011 |
| WO | 2011/151314 A1 | 12/2011 |
| WO | 2012/021208 A2 | 2/2012 |
| WO | 2012/021308 A2 | 2/2012 |
| WO | 2012/088205 A1 | 6/2012 |
| WO | 2012/135679 A2 | 10/2012 |
| WO | 2012/135679 A9 | 1/2013 |
| WO | 2013/013241 A2 | 1/2013 |
| WO | 2014/093345 A1 | 6/2014 |
| WO | 2014/159124 A1 | 10/2014 |
| WO | 2014/184151 A1 | 11/2014 |
| WO | 2015/123154 A1 | 8/2015 |
| WO | 2015/200239 A1 | 12/2015 |
| WO | 2016/158967 A1 | 10/2016 |
| WO | 2016/194707 A1 | 12/2016 |
| WO | 2017/060176 A1 | 4/2017 |
| WO | 2017/060476 A1 | 4/2017 |

OTHER PUBLICATIONS

Irwin M. Hutten, "Testing of Nonwoven Filter media" (Chapter 6) in Handbook of Nonwoven Filter Media (2007), p. 245-290 at 248 (Year: 2007).*

Shagufta U. Patel, Improving Performance and Drainage of Coalescing Filters, Ph.D dissertation, University of Akron (2010) 226p. (Year: 2010).*

International Search Report received for PCT Application No. PCT/US2013/074132, mailed on Mar. 21, 2014, 3 pages.

International Search Report and Written Opinion Received for PCT Application No. PCT/US2015/037055, mailed on Sep. 15, 2015, 7 pages.

Raghavan et al.,"Novel electrospupn poly(vinylidene ftuoride-co-hexafluoropropylene)-in situ SiO2 composite membrane-based polymer electrolyte for lithium batteries", Journal of Power Sources, vol. 184, Issue 2, Oct. 1, 2008, pp. 437-443.

Roche et al.,"Methods Used to Validate Microporous Membranes for the Removal of Mycoplasma", BioPharm , vol. 5, Issue 3, Apr. 1992, pp. 22-33.

Rutledge et al.,"Formation of Fibers by Electrospinning", Advanced Drug Delivery Reviews, vol. 59, Issue 14, Dec. 10, 2007, pp. 1384-1391.

Sang et al.,"Filtration by a novel nanofiber membrane and alumina adsorption to remove copper(II) from groundwater", Journal of Hazardous Materials, vol. 153, Issues 1-2, May 1, 2008, pp. 860-866.

Sang et al.,"Heavy Metal-Contaminated Groundwater Treatment by a Novel Nanofiber Membrane", Desalination, vol. 223, Issues 1-3, Mar. 1, 2008, pp. 349-360.

Sill et al.,"Electrospinning: Applications in Drug Delivery and Tissue Engineering", Biomaterials, vol. 29, Issue 13, May 2008, pp. 1989-2006.

Smit et al.,"Continuous Yarns from Electrospun Fibers", Polymer, vol. 46, Issue 8, Mar. 29, 2005, pp. 2419-2423.

Tan et al.,"Systematic Parameter Study for Ultra-Fine Fiber Fabrication via Electrospinning Process", Polymer, vol. 46, Issue 16, Jul. 25, 2005, pp. 6128-6134.

Teo et al.,"A Review on Electrospinning Design and Nanofibre Assemblies", Nanotechnology, vol. 17, No. 14, Aug. 2006, pp. R89-R106.

Wang et al.,"Electrospun Nanofibrous Membranes for High Flux Microfiltration", Journal of Membrane Science, vol. 392-393, Mar. 1, 2012, pp. 167-174.

Yarin et al.,"Upward Needleless Electrospinning of Multiple Nanofibers", Polymer, vol. 45, Issue 9, Apr. 2004, pp. 2977-2980.

Yoon,"High Flux Ultrafiltration Membranes based on Electrospun Nanofibrous PAN Scaffolds and Chitosan Coating", Polymer, vol. 47, Issue 7, Mar. 22, 2006, pp. 2434-2441.

(56) References Cited

OTHER PUBLICATIONS

Yoshimatsu et al.,"Selective Molecular Adsorption using Electrospun Nanofiber Affinity membranes", Biosensors and Bioelectronics, vol. 23, Issue 7, Feb. 28, 2008, pp. 1208-1215.

Yun et al.,"Nanoparticle Filtration by Electrospun Polymer Fibers", Chemical Engineering Science, vol. 62, Issue 17, Sep. 2007, pp. 4751-4759.

Zeman et al.,"Steric Rejection of Polymeric Solutes by Membranes with Uniform Pore Size Distribution", Separation Science and Technology, vol. 16, No. 3, Apr. 1981, pp. 275-290.

ASTM, "Standard Test Method for Pore Size Characteristics of Membrane Filters using Automated Liquid Porosimeter", E 1294-89, 2008, 2 pages.

Zhao et al.,"Preparation and Properties of Electrospun Poly (Vinylidene Fluoride) Membranes", Journal of Applied Polymer Science, vol. 97, Apr. 2005, pp. 466-474.

Zwijnenberg et al.,"Acetone-Stable Nanofiltration Membranes in Deacidifying Vegetable Oil", Journal of the American Oil Chemists' Society, vol. 76, No. 1, 1999, pp. 83-87.

Extended European Search Report received for EP patent Application No. 07114167.5, mailed on Nov. 6, 2007, 7 pages.

Extended European Serach Report received for EP Patent Application No. 10181774.0, mailed on Nov. 25, 2010, 5 pages.

ASTM International,"Standard Method for Thickness of Textile Materials", Designation: D 1777-64, Reapproved 1975, pp. 477-478.

ASTM International,"Standard Test Method for Determining Bacterial Retention of Membrane Filters Utilized for Liquid Filtration", ASTM International, Designation: F838-15, 2005, 6 pages.

ASTM International,"Standard Test Method for Thickness of Textile Materials", ASTM D1777-96 (Reapproved 2015), Sep. 2015, 5 Pages.

ASTM International,"Standard Test Methods for Pore Size Characteristics of Membrane Filters by Bubble Point and Mean Flow Pore Test", ASTM International, Designation: F316-03 (Reapproved 2011), 2011, 7 pages.

Aussawasathien et al.,"Separation of micron to sub-micron particles from water: Electrospun nylon-6 nanofibrous membranes as prefilters", Journal of Membrane Science, vol. 315, 2008, pp. 11-19.

Barhate et al.,"Nanofibrous Filtering Media: Filtration Problems and Solutions from Tiny Materials", Journal of Membrane Science, vol. 296, Issues 1-2, Jun. 15, 2007, pp. 1-8.

Barhate et al.,"Preparation and Characterization of Nanofibrous Filtering Media", Journal of Membrane Science, vol. 283, Issues 1-2, Oct. 20, 2006, pp. 209-218.

Bhanushali et al.,"Advances in Solvent-Resistant Nanofiltration Membranes: Experimental Observations and Applications", Annals of the New York Academy of Sciences, vol. 984, Mar. 2003, pp. 159-177.

Bjorge et al.,"Performance assessment of electrospun nanofibers for filter applications",Desalination, doi:10.1016/j.desal.2009.06.064, 2009,pp. 942-948.

Blackwell,"Mycoplasma—Recent Developments in Detecting and in Preventing Bioreactor Contamination", BioProcess Technology Consultants, Inc., ISPE Annual Meeting Scottsdale, Arizona, Nov. 6-10, 2005, 38 pages.

Blanchard,"Quantifying Sterilizing Membrane Retention Assurance", BioProcess International, vol. 5, No. 5, May 2007, 6 pages.

Blond et al.,"Strong, Tough, Electrospun Polymer-Nanotube Composite Membranes with Extremely Low Density", Advanced Functional Materials, vol. 18, Issue 17, Sep. 10, 2008, pp. 2618-2624.

Database WPI, Week 200935, Thomson Scientific London, GB, 2009-F08014; XP002726900, 2 pages.

Deitzel et al.,"The Effect of Processing Variables on the Morphology of Electrospun Nanofibers and Textiles", Polymer, vol. 42, Issue 1, Jan. 2001, pp. 261-272.

Dimmock et al.,"Introduction to Modern Virology", Blackwell Publishing Limited, Appendixes: Survey of Virus Properties, Viruses with ssDNA genomes (class 2), 2007, p. 450.

Doshi et al.,"Electrospinning Process and Applications of Electrospun Fibers", Journal of Electrostatics, vol. 35, Issues 2-3, Aug. 1995, pp. 151-160.

Duan et al.,"Preparing Graphitic Nanoribbons from Ultrathin Electrospun Poly( methyl methacrylate) Nanofibers by Electron Beam Irradiation", 2nd IEEE International Nanoelectronics Conference (INEC 2008), Mar. 24-27, 2008, pp. 33-38.

Ebert et al.,"Solvent Resistant Nanofiltration Membranes in Edible Oil Processing", Membrane Technology, vol. 107, 1999, pp. 5-8.

Galka et al.,"Life Sciences: Trends in Biopharmaceutical Filtration and Clarification", Filtration & Separation, vol. 44, No. 3, Apr. 2007, pp. 18-21.

Gibson et al.,"Transport Properties of Porous Membranes Based on Electrospun Nanofibers", Colloids and Surfaces A: Physicochemical and Engineering Aspects, vols. 187-188, Aug. 31, 2001, pp. 469-481.

Gopal et al.,"Electrospun nanofibrous polysulfone membranes as pre-filters: Particulate removal", Journal of Membrane Science, vol. 289, 2007, pp. 210-219.

Granath et al.,"Molecular Weight Distribution Analysis by Gel Chromatography on Sephadex", Journal of Chromatography A, vol. 28, 1967, pp. 69-81.

Guo et al.,"Cellulose Membrane used as Stationary Phase of Membrane Affinity Chromatography", Chinese Chemical Letters, vol. 5, No. 10, 1994, pp. 869-872.

Hazel,"Ensuring Safety of Biopharmaceuticals: Virus and Prion Safety Considerations", Chapter 20, Edited by Meltzer et al., Filtration and Purification in the Biopharmaceutical Industry, 2nd edition, Informa Healthcare USA, Inc.,2008, pp. 543-577.

Hou et al.,"Poly (p-xylylene) Nanotubes by Coating and Removal of Ultrathin Polymer Template Fibers", Macromolecules, vol. 35, 2002, pp. 2429-2431.

Huang et al.,"Electrospun Polymer Nanofibres with Small Diameters", Nanotechnology, vol. 17, No. 6, Feb. 21, 2006, pp. 1558-1563.

Kim et al.,"Characterization and Properties of P(VdF-HFP)Based Fibrous Polymer Electrolyte Membrane Prepared by Electrospinning", Journal of The Electrochemical Society, vol. 152, No. 2, Jan. 2005, pp. A295-A300.

Lev et al.,"Water Filtration by Nanotextiles", Nanocon 2010, Oct. 2010, 6 pages.

Levit et al.,"Supercritical CO2-Assisted Electrospinning", The Journal of Supercritical Fluids, vol. 31, Issue 3, Nov. 2004, pp. 329-333.

Li et al.,"Collecting Electrospun Nanofibers with Patterned Electrodes", Nano Letters, vol. 5, No. 5, 2005, pp. 913-916.

Lin et al.,"Preparation of Poly(ether sulfone) Nanofibers by Gas-Jet/Electrospinning", Journal of Applied Polymer Science, vol. 107, 2008, pp. 909-917.

Lyons et al.,"Melt Electrospinning of Polymers: A Review", Polymer News, vol. 30, No. 6, 2005, pp. 1-9.

Ma et al.,"Electrospun Cellulose Nanofiber as Affinity Membrane", Journal of Membrane Science, vol. 265, Issues 1-2, Nov. 15, 2005, pp. 115-123.

Ma et al.,"Surface Modified Nonwoven Polysulphone (PSU) Fiber Mesh by Electrospinning: A Novel Affinity Membrane", Journal of Membrane Science, vol. 272, Issues 1-2, Mar. 15, 2006, pp. 179-187.

Meltzer,"In Filtration in the Pharmaceutical Industry", Marcel Dekker: New York, 1987, p. 103.

Na et al.,"Effect of Hot-Press on Electrospun Poly(vinylidene fluoride) Membranes", Polymer Engineering & Science, vol. 48, Issue 5, May 2008, pp. 934-940.

International Preliminary Report on Patentability and Written Opinion Received for PCT Application No. PCT/US2012/047865, issued on Jan. 21, 2014, 9 pages.

International Preliminary Report on Patentability and Written Opinion Received for PCT Application No. PCT/US2013/074132, issued on Jun. 16, 2015, 5 pages.

International Search Report and Written Opinion received for PCT Patent Application No. PCT/US012/031549, mailed on Nov. 28, 2012, 15 pages.

(56) References Cited

OTHER PUBLICATIONS

International Preliminary Report on Patentability received for PCT Application No. PCT/US2010/000826 mailed on Sep. 29, 2011, 9 pages.
International Search Report received for PCT Application No. PCT/US2010/000826 mailed on Aug. 16, 2010, 5 pages.
International Preliminary Report on Patentability received for PCT Patent Application No. PCT/US2011/0045905, mailed on Feb. 21, 2013, 7 pages.
International Search Report and Written Opinion received for PCT patent Application No. PCT/US2011/0045905, mailed on Mar. 19, 2012, 13 pages.
International Search Report and Written Opinion received for PCT Patent Application No. PCT/US2012/047865, mailed on Feb. 26, 2013, 18 pages.
Extended European Search Report received for EP patent Application No. 17195327, mailed on Aug. 16, 2018, 10 pages.
Ma et al., "Ultra Fine Cellulose Nanofibers: New Nano-Scale Materials for Water Purification," J Mater Chem, 21:7507-7510 (2011).
Aranha, "Ensuring Safety of Biopharmaceuticals: Virus and Prion Safety Considerations", Chapter 20 in "Filtration and Purification in the Biopharmaceutical Industry," eds.Meltzer et al., 2nd edition, Informa Healthcare USA, Inc., pp. 543-577 (2008).
ASTM F316, 2003, pp. 1-7.
ASTM F838-05, "Standard Test Method for Determining Bacterial Retention of Membrane Filters Utilized for Liquid Filtration," 2005, 6 pages.
ASTM F838-83, "Standard Test Method for Determining Bacterial Retention of Membrane Filters Utilized for Liquid Filtration," 2005, 8 pages.
ASTM International, ASTM E1294-89 (1999) Withdraw Notice, Withdrawn Standard, Standard Test Method for Pore Size Characteristics of Membrane Filters Using Automated Liquid Porosimeter (Withdrawn 2008), p. 1.
ASTM International, Designation: D1777, Reapproved 2011, "Standard Test Method for Thickness of Textile Materials," 5 pages.
ATCC 19146 Product Data Sheet, "Brevundimonas diminuta," pp. 1-2.
Chinese communciation, with English translation, dated Feb. 29, 2016 in co-pending Chinese patent application No. 201380070873.3 (p. 12/101-China).
English translation of WO 2010/069296 A1 (Jun. 2010).
English translation of Japanese communication, dated Apr. 11, 2016 in co-pending Japanese patent application No. 2014-502850.
European communication dated Jul. 20, 2016 in co-pending European patent application No. 13863417.5 (p. 12/101-Europe).
Final Rejection mailed Apr. 30, 2014 in co-pending U.S. Appl. No. 13/436,043.
Final Rejection mailed Aug. 7, 2014 in co-pending U.S. Appl. No. 13/257,501.
Final rejection mailed Sep. 1, 2015 in co-pending U.S. Appl. No. 13/194,227.
International Preliminary Report on Patentability mailed Feb. 21, 2013 in co-pending PCT application No. PCT/US2011/045905.
International Preliminary Report on Patentability received for PCT Application No. PCT/US2010/000826 mailed on Sep. 26, 2011, 9 pages.
International Preliminary Report on Patentability received for PCT Patent Application No. PCT/US012/031549, mailed on Oct. 10, 2013, 10 pages.
International Preliminary Report on Patentability received for PCT Patent Application No. PCT/US2011/045805, mailed on Feb. 21, 2013, 7 pages.
International Search Report and Written Opinion mailed Feb. 26, 2013 in co-pending PCT application No. PCT/US2012/047865.
International Search Report and Written Opinion mailed Mar. 19, 2012 in co-pending PCT application No. PCT/US2011/045905.
International Search Report and Written Opinion mailed Aug. 16, 2010 in co-pending PCT application No. PCT/US2010/000826.
International Search Report and Written Opinion received for PCT Application No. PCT/US2012/031549, mailed on Nov. 28, 2012, 15 pages.
International Search Report and Written Opinion received for PCT Application No. PCT/US2012/047665, mailed on Feb. 25, 2013, 18 pages.
International Search Report and Written Opinion Received for PCT Application No. PCT/US2016/018146, mailed on Jun. 7, 2016, 11 pages.
Japanese communication, with English translation, dated Jun. 7, 2016 in co-pending Japanese patent application No. 2015-545930 (p. 12/101-Japan).
Japanese communication, with English translation, mailed Mar. 18, 2014 in co-pending Japanese patent application No. 2013-524096.
Japanese communication, with English translation, mailed Apr. 7, 2015 in co-pending Japanese patent application No. 2014-521858.
Jiang et al., Professional Knowledge of Traditional Chinese Pharmacology, p. 233, Jun. 2007.
Korean communication, with English translation, dated Mar. 28, 2016 in co-pending Korean patent application No. 10-2013-7031748.
Meltzer et al., "Filtration and Purification in the Biopharmaceuticals Industry: Ensuring Safety of Biopharmaceuticals Virus and Prion Safety Considerations," 2nd edition, Informa Healthcare USA, Inc., Chapter 20, 2006, pp. 543-577.
Na et al., "Effects of Hot-Press on Electrospun Poly(vinylidene fluoride) Membranes," Polym Eng Sci, 48: 934-940 (2008).
Office Action mailed Oct. 23, 2013 in co-pending U.S. Appl. No. 13/436,043.
Office Action mailed Dec. 13, 2013 in co-pending U.S. Appl. No. 13/257,501.
Office Action mailed Mar. 3, 2015 in co-pending U.S. Appl. No. 13/194,227.
Office Action mailed Mar. 24, 2015 in co-pending U.S. Appl. No. 13/436,043.
Office Action mailed Apr. 12, 2016 in co-pending U.S. Appl. No. 14/118,490.
Office Action mailed Sep. 30, 2015 in co-pending U.S. Appl. No. 13/257,501.
Office Action—Restriction—mailed Jul. 31, 2013 in co-pending U.S. Appl. No. 13/194,227.
Segers et al., "Classification of Pseudomonas diminuta Leifson and Hugh 1954 and Pseudomonas vesicularis Busing, Döll, and Freytag 1953 in Brevundimonas gen. nov. as Brevundimonas diminuta comb. nov. and Brevundimonas vesicularis comb. nov., Respectively," Int J Syst Bacteriol, 44(3): 499-510 (Jul. 1994).
Extended European Search Report issued in European Application No. 12814718.8, mailed on Feb. 20, 2015, 8 pages.
Extended European Search Report received for European Patent Application No. 12765651.0, mailed on Oct. 16, 2014, 9 pages.
Jung et al., "Detection and Treatment of Mycoplasma Contamination in Cultured Cells", Chang Gung Medical Journal, vol. 26, No. 4, Apr. 2003, pp. 250-258.
Ladewig et al., "Fundamentals of Membrane Processes", Chapter 2, Fundamentals of Membrane Bioreactors, Springer, Singapore, 2017, pp. 13-37.
Wisher Martin, "Biosafety and Product Release Testing Issues Relevant to Replication-Competent Oncolytic Viruses", Cancer Gene Therapy, vol. 9, Sep. 12, 2002, pp. 1056-1061.
Hou Xiang-Lin, "China Oil Refining Technologies", China Petrochemical Press, 1st Edition, Dec. 1991, p. 677.
Office Action received for Chinese Patent Application No. 202110189947.1 mailed on Feb. 16, 2022, 10 Pages. (4 pages of English translation & 6 pages of Official Copy).
Office Action received for Chinese Patent Application No. 201880061113.9 mailed on May 7, 2022, 19 Pages (11 Pages of English Translation & 8 Pages of Official Copy).
Final Office Action Received for U.S. Appl. No. 14/118,490, mailed on Jun. 16, 2022, 14 Pages.
Final Office Action Received for U.S. Appl. No. 16/631,572, mailed on Jun. 9, 2022, 12 Pages.
Non Final Office Action Received for U.S. Appl. No. 16/631,572, mailed on May 12, 2022, 12 Pages.

(56) References Cited

OTHER PUBLICATIONS

Office Action received for Japanese Patent Application No. 2020-524695 issued on Apr. 5, 2022, 9 pages (5 pages of official Copy & 4 pages of English Translation).
Communication pursuant to Article 94(3) EPC received for European Patent Application No. 12814718.8 mailed on Jul. 29, 2022, 5 Pages.
Non Final Office Action Received for U.S. Appl. No. 14/118,490, mailed on Oct. 3, 2022, 12 Pages.
Final Office Action Received for U.S. Appl. No. 16/631,572, mailed on Aug. 2, 2022, 13 Pages.
Final Office Action Received for U.S. Appl. No. 14/648,925, mailed on Jul. 19, 2022, 16 Pages.
Office Action received for Chinese Patent Application No. 201880061113.9 mailed on Oct. 26, 2022, 19 Pages (13 Pages of English translation & 6 Pages of Official copy).
Office Action received for Korean Patent Application No. 10-2022-7017603, mailing date Feb. 28, 2023, 14 Pages (7 Pages of English Translation & 7 Pages of Official Copy).
Office Action received for Chinese Patent Application No. 202110189947.1 mailed on Sep. 15, 2022, 5 Pages (2 Pages of English Translation and 3 Pages of Official Copy).
Non Final Office Action Received for U.S. Appl. No. 16/631,572, mailing date Jun. 1, 2023, 13 Pages.
Office Action received for Chinese Patent Application No. 202110189947.1 mailing date Mar. 24, 2023, 8 Pages (4 Pages of English Translation and 4 Pages of Official copy).
Office Action received for Japanese Patent Application No. 2022-163021 mailing date Dec. 12, 2023, 5 Pages (2 Page of English translation and 3 pages of official copy).
Examination Report received for Canadian Patent Application No. 3,116,905 mailing date Feb. 25, 2022, 4 pages.
International Preliminary Report on Patentability received for PCT Patent Application No. PCT/US2019/059027, mailing on May 14, 2021, 8 pages.
International Search Report and Written Opinion received for PCT Patent Application No. PCT/US2019/059027 mailing on Jan. 20, 2020, 10 pages.
Invitation to Respond to Written Opinion received for Singapore Application No. 10201600617P, mailing date Nov. 3, 2021, 4 Pages.
Office Action received for Korean Patent Application No. 10-2021-7013160, mailing date Jul. 20, 2022, 17 Pages (5 Pages of English translation & 12 Pages of Official Copy).
Office Action received for Korean Patent Application No. 10-2021-7013160, mailing date May 26, 2023, 7 Pages (3 Pages of English Translation & 4 Pages of Official copy).
Communication pursuant to Article 94(3) EPC received for European Patent Application No. 16708843.4 mailing date Feb. 10, 2023, 4 Pages.
Communication pursuant to Article 94(3) EPC received for European Patent Application No. 16708843.4 mailing date May 3, 2022, 6 Pages.
Communication pursuant to Article 94(3) EPC received for European Patent Application No. 16708843.4 mailing date Oct. 7, 2020, 6 Pages.
Non Final Office Action Received for U.S. Appl. No. 17/290,024, mailing date Apr. 13, 2023, 28 Pages.
Communication pursuant to Article 94(3) EPC received for European Patent Application No. 17195327.6 mailing date Apr. 14, 2020, 6 Pages.
Communication pursuant to Article 94(3) EPC received for European Patent Application No. 17195327.6 mailing date Oct. 12, 2020, 6 Pages.
Office Action received for Chinese Patent Application No. 201510849372.6 mailing date Dec. 29, 2020, 13 Pages (5 Pages of English Translation and 8 Pages of Official Copy).
Office Action received for Chinese Patent Application No. 201510849372.6 mailing date Sep. 11, 2020, 9 Pages (4 Pages of English translation & 5 Pages of official copy).

First Examination Report received for Indian Application No. 201717028987 mailing date Dec. 27, 2019, 5 Pages.
Office Action received for Chinese Patent Application No. 201810258257.5 mailing date Jan. 4, 2021, 14 Pages (8 Pages of English Translation & 6 Pages of Official Copy).
Office Action received for Chinese Patent Application No. 201810258257.5 mailing date Mar. 19, 2020, 15 Pages (7 Pages of English translation & 8 Pages of official copy).
First Examination Report received for Indian Application No. 201918002024 mailing date Sep. 10, 2020, 7 Pages.
Office Action received for Chinese Patent Application No. 201980081896.1 mailing date Jun. 15, 2022, 26 Pages (14 Pages of English Translation & 12 Pages of Official Copy).
Office Action received for Chinese Patent Application No. 201980081896.1 mailing date Apr. 28, 2023, 19 Pages (13 Pages of English translation & 6 Pages of Official copy).
Office Action received for Chineses Patent Application No. 201980081896.1 mailing date Dec. 13, 2022, 19 Pages (13 Pages of English Translation & 6 Pages of Official copy).
Office Action received for Japanese Patent Application No. 2020171157 mailing date Oct. 26, 2021, 7 Pages (3 Pages of English Translation & 4 Pages of Official copy).
Office Action received for Japanese Patent Application No. 2021523066 mailing date Jul. 12, 2022, 18 Pages (14 Pages of English Translation & 4 Pages of Official copy).
Office Action received for Japanese Patent Application No. 2021-523066 mailing date Mar. 22, 2023, 8 Pages (4 Pages of English Translation and 4 Pages of Official copy).
Office Action received for Canadian Patent Application No. 3,116,905 mailing date Nov. 8, 2022, 5 Pages.
Office Action received for Canadian Patent Application No. 3,116,905 mailing date Jul. 12, 2023, 4 Pages.
Communication pursuant to Article 94(3) EPC received for European Patent Application No. 16708843.4 mailing date Jan. 24, 2024, 6 Pages.
Li, Jun,"HygieneCourse of Medicine GMP", China Pharmaceutical Science and Technology Press, Nov. 2003, 5 Pages.
Liu, Zheng,"Practical Manual of Laboratory Biosafety Management and Laboratory Safety Assessment Accreditation Standards", Ningxia Dadi audiovisual publishing house, vol. 2, Jun. 2004, 5 pages.
Office Action received for Korean Patent Application No. 10-2022-7017603 mailing date Sep. 22, 2023, 15 Pages (7 Pages of English translation & 8 Pages of official copy).
Non Final Office Action Received for U.S. Appl. No. 16/631,572, mailing date Nov. 22, 2023, 9 pages.
Communication pursuant to Article 94(3) EPC received for European Patent Application No. 18765711.9 mailing date Jul. 27, 2023, 5 Pages.
Office Action received for Chinese Patent Application No. 201810258257.5 mailing date Nov. 21, 2023, 12 Pages (6 Pages of English Translation & 6 Pages of Official Copy).
Li Jun, HygieneCourse of Medicine GMP, China Pharmaceutical Science and Technology Press, pp. 119-121, published on Nov. 2003.
Liu Zheng, Practical Manual of Laboratory Biosafety Management and Laboratory Safety Assessment Accreditation Standards (vol. 2), Ningxia Dadi audiovisual publishing house, p. 1408, published on Jun. 2004.
Office Action received for Korean Patent Application No. 10-2022-7017603 mailing date May 27, 2024, 9 Pages (4 Pages of English translation & 5 Pages of official copy).
Notice of Allowance received for U.S. Appl. No. 16/631,572, mailing date May 14, 2024, 08 Pages.
Final Office Action received for U.S. Appl. No. 13/194,227, mailed on Aug. 21, 2014, 9 pages.
Non Final Office Action received for U.S. Appl. No. 13/194,227, mailed on Jun. 14, 2016, 8 pages.
Non Final Office Action received for U.S. Appl. No. 13/194,227, mailed on Oct. 31, 2013, 8 pages.
Final Office Action received for U.S. Appl. No. 13/257,501, mailed on Jul. 11, 2016, 28 pages.
Final Office Action received for U.S. Appl. No. 13/436,043, mailed on Oct. 14, 2015, 15 pages.

(56) References Cited

OTHER PUBLICATIONS

Reis, et al., "Membrane Separations in Biotechnology", Current Opinion in Biotechnology, 2001, vol. 12, pp. 208-211.
Grzenia, et al., "Tangential flow filtration for virus purification", Journal of Membrane Science 321, May 21, 2008, pp. 373-380.
Mohammadzadehmoghadam, et al., "Electrospinning: Current Status and Future Trends", Nano-size polymers, 2016, pp. 89-154.
International Preliminary Report on Patentability for PCT Application No. PCT/US2015/037055 mailed on Jan. 5, 2017, 7 pages.
Schwartz, "Diafiltration for Desalting or Buffer Exchange", BioProcess International, May 2003, pp. 43-49.
Sterlitech Corporation, "What is Cross Flow Velocity? | Environmental XPRT", Available online at https://www.environmental-expert.com/articles/what-is-cross-flow-velocity-703133. Obtained online Aug. 29, 2019., May 26, 2017, 5 pages.
Strathmann, "Preparation of Microporous Membranes by Phase Inversion Processes", Membranes and Membrane Processes, 1986, pp. 115-135.
Tang, et al., "Design and Fabrication of Electrospun Polyethersulfone Nanofibrous Scaffold for High-flux Nanofiltration Membranes", Journal of Polymer Science, vol. 47, Aug. 16, 2009, pp. 2288-2300.
Huang, et al., "A Review on Polymer Nanofibers by Electro-Spinning Applications in Nanocomposites", Composites Sci. Tech., 2003, vol. 63, pp. 2223-2253.
Sajid, et al., "Designs, Formats and Applications of Lateral Flow Assay: A Literature Review", Journal of Saudi Chemical Society, Sep. 16, 2014, vol. 19, pp. 689-705.

\* cited by examiner

FILTER STRUCTURE WITH ENHANCED DIRT HOLDING CAPACITY

CROSS-REFERENCE TO RELATED APPLICATIONS AND SEQUENCE LISTING

The present application is a U.S. National Stage Application of International Application No. PCT/US2015/037055, filing date Jun. 23, 2015, which claims the benefit of priority of U.S. Patent Application No. 62/017,463, filing date Jun. 26, 2014, each of which is incorporated by reference herein in their entirety.

FIELD OF THE INVENTION

The present invention relates generally to fluid filtration devices, and more particularly to a fluid filtration device incorporating a composite media filter structure, as well as methods of using and making such devices and structures.

BACKGROUND OF THE INVENTION

Fluid filters designed for removal of unwanted particulates and contaminants are susceptible to clogging due to the fact that as particles and contaminants become trapped in the filter medium, fluid pathways become closed or restricted. The capacity or service life of a filter is related to its ability to flow fluid at a rate above a minimum value, or to maintain a desired flow rate at a pressure below a maximum value.

One approach towards increasing the required dirt-holding capacity or service life of a filter is to protect the final filter with a prefilter having a coarser structure. A prefilter will generally have a particle size removal rating larger than that of the final filter. Because the coarser structure of the prefilter will remove relatively large particles that would otherwise clog the final filter, the service life of the final filter will be increased. In addition, owing to its coarser structure, the prefilter will not clog as readily as the final filter against the same particulate challenge. Therefore, the combined prefilter and final filter allows for a longer filter service life as compared to the final filter by itself.

The addition of a coarser structure prefilter to a filter device does however have drawbacks, such as the cost associated with supporting and housing the additional prefilter material in a device. The addition of a prefilter can increase the total space occupied by the filtration system. This increase in filter volume is considered a drawback since compactness is a desired property of a filtration system.

It is therefore desirable to develop a fluid filtration structure having an increased service life and required dirt-holding capacity, capable of removing relatively large contaminants and particles that would otherwise clog a final filter. It is also desirable to lower the manufacturing cost of a fluid filtration device, as well as reduce the overall size requirements of such a device, by incorporating a fluid filtration structure having these advantageous properties.

SUMMARY OF THE INVENTION

In response to the above needs and problems associated with prefilter and final filter assemblies, the present invention provides fluid filtration structures comprising a composite filter media having a coarse porous interlayer located between at least two fiber containing porous filter layers. In certain embodiments, the at least two porous filter layers are made from electrospun polymeric nanofibers each having a different fiber diameter.

Another embodiment of the invention includes a composite filter media containing one or more polymeric non-woven coarse interlayers located between the at least two polymeric fiber containing filter layers or mats.

Other embodiments of the invention include a composite filter media having (i) a first filter mat comprising first polymeric fibers having a first fiber diameter, (ii) a second filter mat comprising second polymeric fibers having a second fiber diameter, and (iii) a coarse interlayer located between the first and second filter mats, wherein the first fiber diameter is different from the second fiber diameter, and each filter mat has a different pore size rating as determined by the actual pore sizes.

In another embodiment of the invention, the first and second polymeric fibers in the composite filter media are nanofibers.

In another embodiment of the invention, the first and second polymeric nanofibers are electrospun nanofibers.

In certain embodiments, the invention provides a composite filter media containing an interlayer having a coarser pore size when compared to either of the first or second filter layers, wherein the mean pore size of the interlayer is approximately 2 to 100 times larger than the mean pore size of the first or second fiber containing filter layers on either side of the interlayer, such that the resulting composite filter media has an increased dirt holding capacity compared to filter layers that are layered directly over each other without the presence of the coarser interlayer therebetween.

In still other embodiments, the invention provides a fluid filtration device housing a fluid filtration structure comprising a composite media made from one or more polymeric non-woven coarse interlayers located between at least two polymeric fiber containing filter mats.

In another embodiment of the invention, the at least two polymeric fibers in the composite filter media are nanofibers.

In another embodiment of the invention, the nanofibers are electrospun nanofibers.

In still other embodiments, the invention provides methods of using and methods of making a fluid filtration device housing a fluid filtration structure comprising a composite media made from one or more polymeric non-woven coarse interlayers located between at least two polymeric fiber containing filter mats.

Another embodiment of the invention provides methods of using and methods of making the composite media wherein the polymeric fibers are nanofibers.

Another embodiment of the invention provides methods of using and methods of making the composite media wherein the polymeric nanofibers are electrospun nanofibers.

Additional features and advantages of the embodiments of the invention will be set forth in the detailed description, claims, and drawings which follow. The specific embodiments described herein are offered by way of example only and are not meant to be limiting in any way. Many modifications and variations of this invention can be made without departing from its spirit and scope, as will be apparent to those skilled in the art. Further aspects and advantages of the present invention will become apparent from the description hereinafter.

DETAILED DESCRIPTION OF EMBODIMENTS OF THE INVENTION

Figure 1A:
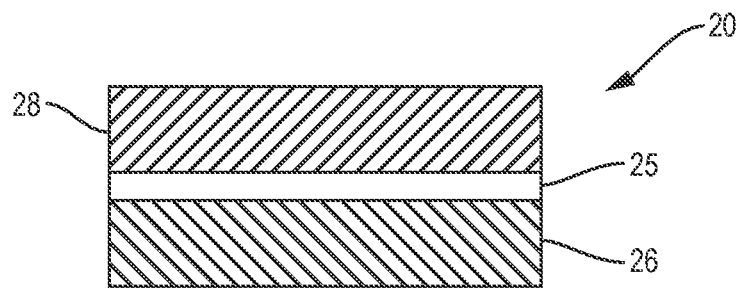
FIGS. 1A, 1B, and 1C depict cross-sectional views of composite media structures in accordance with certain embodiments of the invention.

Unless otherwise indicated, all numbers expressing quantities of ingredients, cell culture, treatment conditions, and so forth used in the specification, including claims, are to be understood as being modified in all instances by the term "about." Accordingly, unless otherwise indicated to the contrary, the numerical parameters are approximations and may vary depending upon the desired properties sought to be obtained by the present invention.

For the purposes of this specification and appended claims, unless otherwise indicated, all numbers expressing quantities of ingredients, percentages or proportions of materials, reaction conditions, and other numerical values used in the specification and claims, are to be understood as being modified in all instances by the term "about".

Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass all subranges subsumed therein.

Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context.

The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Many modifications and variations of this invention can be made without departing from its spirit and scope, as will be apparent to those skilled in the art. The specific embodiments described herein are offered by way of example only and are not meant to be limiting in any way. It is intended that the specification and examples be considered as exemplary only, with the true scope and spirit of the invention being indicated by the following claims.

Before describing the present invention in further detail, a number of terms will be defined. Use of these terms does not limit the scope of the invention but only serve to facilitate the description of the invention. Additional definitions may be set forth throughout the detailed description.

I. DEFINITIONS

The use of the terms "a" and "an" and "the" and similar referents in the context of describing the invention (especially in the context of the following claims) are to be construed to cover both the singular and the plural, unless otherwise indicated herein or clearly contradicted by context.

Unless otherwise indicated, the term "at least" preceding a series of elements is to be understood to refer to every element in the series.

As used herein, the term "nanofibers" refers to fibers having diameters varying from a few nanometers up to 1,000 nanometers. For example, the present invention may have nanofibers in the first fiber containing filter layer have a fiber diameter from about 10 nm to about 1,000 nm, and the nanofibers in the second fiber containing filter layer have a fiber diameter from about 10 nm to about 1,000 nm.

As used herein, the terms "fluid filtration structure", "composite media", "composite medium", "filter medium" or "filter media" refer to a collection of materials through which a fluid carrying the product of interest as well as particles and contaminants passes, wherein the particles and contaminants are deposited in or on the media.

As used herein, the term "permeability" refers to the rate at which a volume of fluid passes through a filtration medium of a given area at a given pressure drop across the filter. Common units of permeability are liters per square meter per hour for each psi of pressure drop, abbreviated as LMH/psi.

The term "electrospinning" or "electrospun", as used herein, refers to an electrostatic spinning process of producing nanofibers from a polymer solution or melt by applying an electric potential to such solution. The electrostatic spinning process for making an electrospun nanofiber mat for a filtration medium, including a suitable apparatus for performing the electrostatic spinning process is disclosed in International Publication Nos. WO 2005/024101, WO 2006/131081, and WO 2008/106903, each fully incorporated herein by reference, and each assigned to Elmarco S.R.O., of Liberec, Czech Republic.

The term "nanofiber mat" as used herein, refers to an assembly of multiple nanofibers, such that the thickness of the mat is typically at least about 10 times greater than the diameter of a single fiber in the mat. For example, the first fiber containing filter layer may have a thickness from about 1 μm to about 1,000 μm and the second fiber containing filter layer has a thickness from about μm to about 1,000 μm. The nanofibers can be arranged randomly in the mat, or aligned along one or multiple axes.

Additionally, the nanofiber mat or filter of the first and second fiber containing filter layers are selected from the group consisting of gridded filter, disc shaped filter, pleated filter, depth filter and combinations thereof.

The term "biopharmaceutical preparation" or "sample" as used herein, refers to any liquid composition containing a product of interest (e.g., a therapeutic protein or an antibody) and unwanted components, particles, and contaminants or particles, such as protein aggregates (e.g., high molecular weight aggregates of the product of interest).

II. EXEMPLARY FLUID FILTRATION STRUCTURES

FIG. 1A depicts an exemplary embodiment of the fluid filtration structure (20) including a composite media comprising at least one coarse porous nonwoven interlayer (25) located between first (26) and second (28) electrospun polymeric fiber containing filter mats.

Figure 1B:
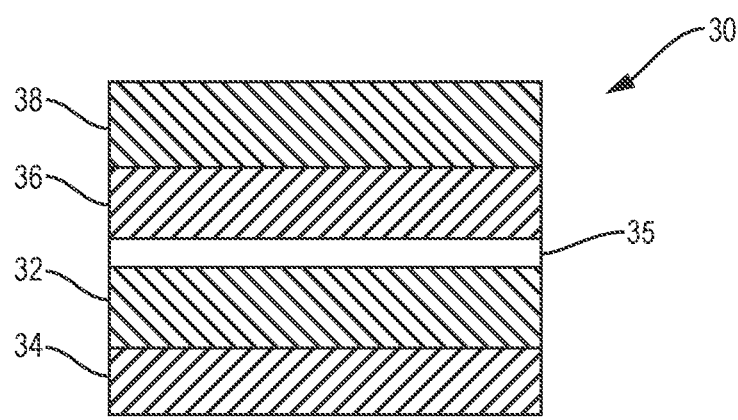

FIG. 1B depicts an exemplary embodiment of the fluid filtration structure (30) including a composite media comprising at least one coarse porous nonwoven interlayer (35) located between first (32) and second (36) electrospun polymeric fiber containing filter mats, and additional electrospun polymeric fiber containing mats (34, 38) each having a different pore size rating compared to the first and second fiber containing mats. Mats (36, 38) and (32, 34) are layered respectively over each other to form an asymmetric structure. Creating asymmetry in such mat structures improves the dirt holding capacity of the composite media filters. In effect, the coarser portion of the fluid filtration structure that faces the challenge stream acts as prefilter for the finer portion of the structure that is designed to prevent passage of particles larger than a specified size (the "retentive" layer).

Figure 1C:
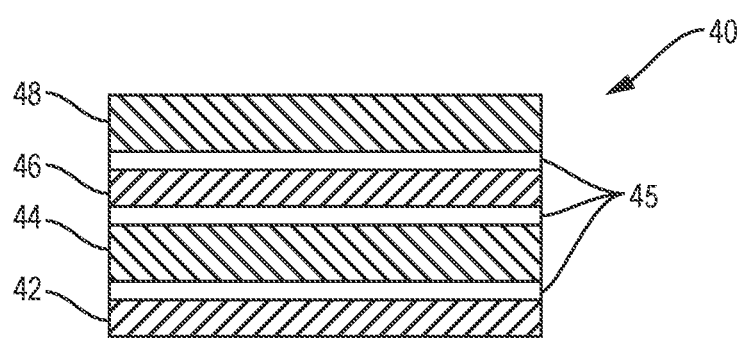

FIG. 1C depicts an exemplary embodiment of the fluid filtration structure (40) including a composite media comprising at least one coarse porous nonwoven interlayers (45) located between first (42) and second (44); third (46) and second (44); and fourth (48) and third (46) electrospun polymeric fiber containing filter mats.

III. EXEMPLARY NANOFIBER POLYMERIC MATERIALS

Certain exemplary embodiments of polymers suitable for use as the electrospun nanofibers of the invention include thermoplastic and thermoset polymers. Nonlimiting examples of suitable polymers include nylon, polyimide, aliphatic polyamide, aromatic polyamide, polysulfone, cellulose, cellulose acetate, polyether sulfone, polyurethane, poly(urea urethane), polybenzimidazole, polyetherimide, polyacrylonitrile, poly(ethylene terephthalate), polypropylene, polyaniline, poly(ethylene oxide), poly(ethylene naphthalate), poly(butylene terephthalate), styrene butadiene rubber, polystyrene, poly(vinyl chloride), poly(vinyl alcohol), poly(vinyl acetate), poly(vinylidene fluoride), poly(vinyl butylene), copolymers, derivative compounds, blends and combinations thereof. Suitable polyamide condensation polymers, include nylon-6; nylon-4,6; nylon-6,6; nylon 6,6-6,10; copolymers of the same, and other linear generally aliphatic nylon compositions and the like.

The present invention comprises a fluid filtration device comprising: a holder having an inlet, a filtrate outlet, a retentate outlet, and the composite media of the present invention, wherein the composite media is located in the holder and separates the holder into an upstream compartment and a downstream compartment. Further still, the fluid filtration device may be selected from the group consisting of a plastic holder, laboratory device, syringe, microtiter plate, metal holder, filter cartridge, and cartridge.

The term "nylon" as used herein includes nylon-6, nylon-6,6, nylon 6,6-6,10, and copolymers, derivative compounds, blends and combinations thereof.

IV. EXEMPLARY METHODS OF FORMING POROUS FIBROUS MATS

Certain exemplary embodiments of the fibrous porous mats are made by depositing nanofiber(s) from a nylon solution. Such nanofiber filter mats have a preferred basis weight of between about 0.1 g/m$^2$ and about 10 g/m$^2$, as measured on a dry basis, (i.e., after the residual solvent has evaporated or otherwise been removed).

In other exemplary embodiments, the nylon is dissolved in a mixture of solvents including, but not limited to, formic acid, sulfuric acid, acetic acid, 2,2,2-trifluoroethanol, 2,2,2,3,3,3-hexafluoropropanol, and water.

In other exemplary embodiments, the nylon solution is prepared by dissolving dry nylon polymers in one group of solvents (i.e., first preparing a stock solution) then adding other solvents to make the solution ready for electrospinning.

In other exemplary embodiments, the nylon polymers (i.e., starting) are partially hydrolyzed over the course of solution preparation, such that the average molecular weight of the partially hydrolyzed nylon polymers (i.e., ending) are less than the average molecular weight of the starting nylon polymers.

In certain exemplary embodiments, a single or multilayered porous coarse nonwoven interlayer substrates or supports are arranged on a moving collection belt to collect and combine with the electrospun nanofiber filter layer, forming a composite filtration media structure.

One preferred method for generating porous filter membranes for particulate removal is to place fibers of a controlled size on a porous mat substrate such that the spaces among the fibers constitute the filter pores. The average pore diameter is related to the fiber diameter according to Equation 1 below:

$$d = \frac{d_f \varepsilon}{(1-\varepsilon)}$$

$$d_f$$

Equation 1 (where d is the average pore diameter, $d_f$ is the fiber diameter, and ε is the porosity of the mat)

A composite graded fiber filter structure can be formed by layering filter mats of different controlled fiber sizes on each other. In this way, an essentially asymmetric porous structure can be formed. As provided above, this asymmetric porous structure allows for a higher dirt holding capacity than a symmetric structure.

Figure 1D:
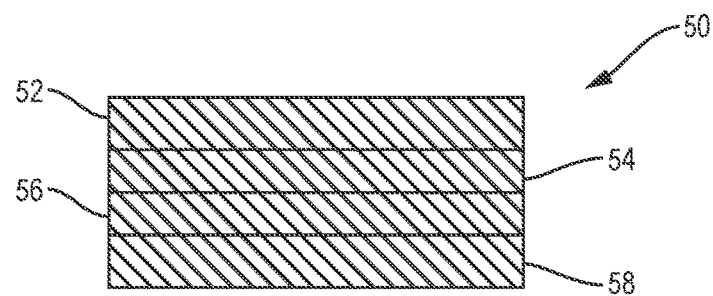
FIG. 1D depicts a cross-sectional view of a prior art multilayer filter with no interlayers located between each filter layer.
Figure 1E:
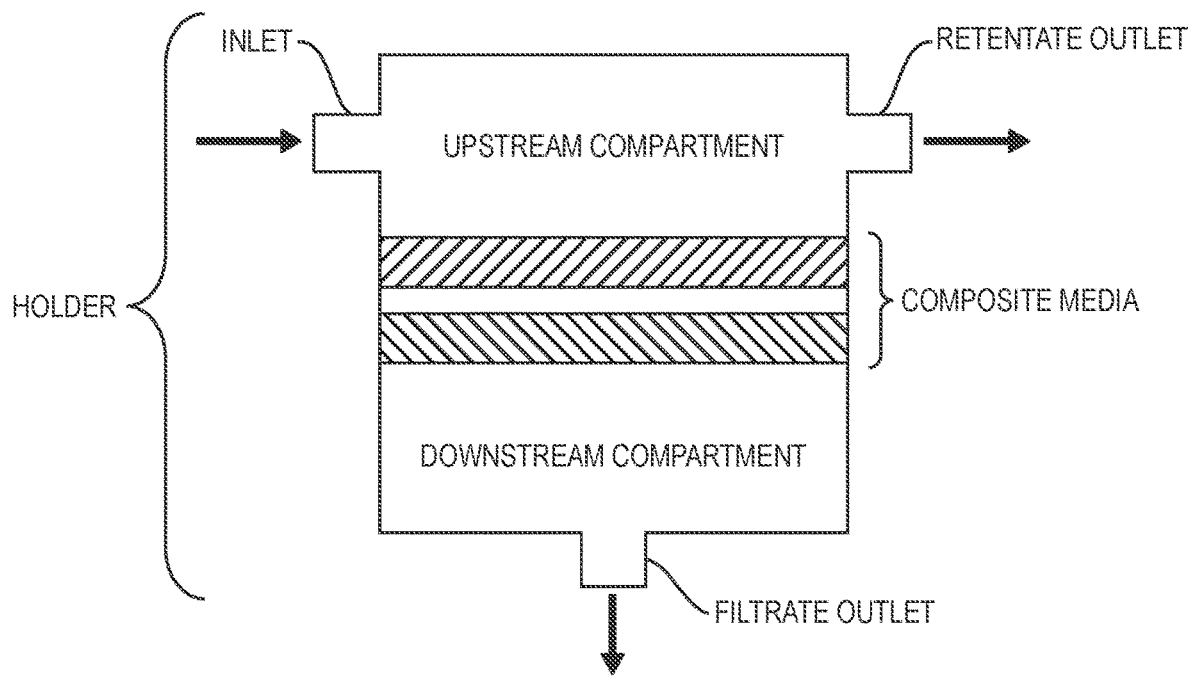
FIG. 1E depicts a fluid filtration device comprising: a holder having an inlet, a filtrate outlet, a retentate outlet, and a composite media, wherein the composite media is located in the holder and separates the holder into an upstream compartment and a downstream compartment.

FIG. 1D depicts a conventional graded fiber filter mat arrangements (50) wherein the fiber containing filter mat layers are typically laid directly against each other. (52, 54, 56, 58)

However, it has been surprisingly found that by separating the fiber filter mat layers with a porous interlayer having a much coarser pore size than any of the fiber filter mat layers, clogging resistance in such fiber filtration structures are substantially improved compared to filtration structures where the fiber filter mat layers are directly in contact with each other (i.e., no porous support interlayer located between each filtration mat layer). (FIG. 1A)

The mechanism that allows for the higher clogging resistance associated with the coarse interlayer separating the individual fiber mat layers is not well understood, although it can be speculated that particles may have an increased tendency to become trapped at the interface between fiber mat layers of different fiber sizes. Regardless of the actual mechanism, the addition of a porous coarse interlayer results in reduced filter clogging and therefore increased service life of the filter.

Other considerations for choosing a multilayered filtration structure include economics and convenience of media and device manufacturing, as well as ease of sterilization and validation. The preferred filter layer configuration for the filtration medium is often selected based on practical considerations.

V. EXEMPLARY INTERLAYER SUBSTRATES FOR COLLECTING THE NANOFIBERS

The fluid filter layers collected or deposited on the coarse interlayer are either a single or multi-layer configuration.

Examples of single or multilayered porous coarse interlayers include, but are not limited to, spunbonded nonwovens, meltblown nonwovens, needle punched nonwovens, spunlaced nonwovens, wet laid nonwovens, resin-bonded nonwovens and combinations thereof.

Exemplary embodiments of the porous coarse interlayer are made from synthetic or natural polymeric materials. Thermoplastics are a useful class of polymers for this use. Thermoplastics include but are not limited to polyolefins such as polyethylenes, including ultrahigh molecular weight polyethylenes, polypropylenes, sheathed polyethylene/polypropylene fibers, PVDF, polysulfone, polyethersulfones, polyarylsulphones, polyphenylsulfones, polyvinyl chlorides, polyesters such as polyethylene terephthalate, polybutylene terephthalate and the like, polyamides, acrylates such as polymethylmethacrylate, styrenic polymers and mixtures of the above. Other synthetic materials include celluloses, epoxies, urethanes and the like.

Suitable porous coarse interlayer substrates include porous non-woven substrates, (i.e., those having pore sizes from about (1) μm to about (100 μm.

The porous coarse interlayer material can be hydrophilic nonwovens or hydrophobic nonwovens and include, but are not limited to, polyolefins, polypropylene, polyvinylidene fluoride, polytetafluoroethylene, polysulfones, polycarbonates, polyesters, polyacrylates, and polymethacrylates.

The porous coarse interlayer has two major opposing surfaces or sides (i.e., opposing first and second sides) associated with a geometric and/or physical structure and/or shape of the interlayer. When the composite media is being used in sample filtration, fluid will flow from one side (surface) through the interlayer substrate and through the opposing other side (surface).

The thickness dimension between the two opposing surfaces of the interlayer is porous. This porous region has a surface area associated with the pores. In order to prevent confusion related to the terms "surface", "surfaces", or "surface area," or similar usages, the geometric surfaces will be referred to as external or facial surfaces or as sides. The surface area associated with the pores will be referred to as internal or porous surface area.

Porous material of the interlayer comprises pores which are empty space, and the solid matrix or skeleton which makes up the physical embodiment of the interlayer material. For example, in a non-woven interlayer, the randomly oriented fibers make up the matrix and give the interlayer its form.

When the composite media includes a coating or covering on a surface of the composite media means that the internal and external surfaces are coated so as to not completely block the pores, that is, to retain a significant proportion of the porous structure for convective flow. In particular, for the internal surface area, coating or covering means that the porous matrix is coated or covered, leaving a significant proportion of the pores open.

VI. EXEMPLARY TEST METHODS PERFORMED

"Basis weight" is determined by ASTM D-3776, which is incorporated herein by reference and reported in g/m².

"Porosity" was calculated by dividing the basis weight of the sample in g/m² by the polymer density in g/cm³, by the sample thickness in micrometers, multiplying by 100, and subtracting the resulting number from 100, i.e., porosity=100−[basis weight/(density×thickness)×100].

Fiber diameter was determined as follows: a scanning electron microscope (SEM) image was taken at 60,000 times magnification of each side of a nanofiber mat sample. The diameter of ten (10) clearly distinguishable nanofibers were measured from each SEM image and recorded. Defects were not included (i.e., lumps of nanofibers, polymer drops, intersections of nanofibers). The average fiber diameter of each side of the nanofiber mat sample was calculated. The measured diameters also include a metal coating applied during sample preparations for SEM. It was established that such coating adds approximately 4 to 5 nm to the measured diameter. The diameters reported here have been corrected for this difference by subtracting 5 nm from the measured diameter.

Thickness was determined by ASTM D1777-64, which is incorporated herein by reference, and is reported in micrometers (or microns) and is represented by the symbol "μm".

"Permeability" is the rate at which fluid passes through the composite filter media samples of a given area at a given pressure drop, and measured by passing deionized water through composite filter media samples having a diameter of 25 (3.5 cm² filtration area) mm. The water was forced through the composite filter media samples using hydraulic pressure (water head pressure) or pneumatic pressure (air pressure over water).

The "effective pore size" of an electrospun mat can be measured using conventional membrane techniques such as bubble point, liquid-liquid porometry, and challenge test with particles of certain sizes. It is known that the effective pore size of a fibrous mat generally increases with the fiber diameter and decreases with porosity.

Membrane manufacturers assign nominal pore size ratings to commercial membrane filters, which usually indicate meeting certain retention criteria for particles or microorganisms rather than geometrical size of the actual pores.

The invention will be further clarified by the following examples of exemplary embodiments which are intended to be exemplary of the invention.

EXAMPLES

Preparation of Nylon Stock Solution for Electrospinning

Example 1. provides an exemplary procedure for preparing a nylon solution for electrospinning in accordance with certain embodiments of this invention.

Nylon 6 was supplied by BASF Corp., Florham Park, NJ, USA, under the trademark Ultramid B24. Solutions of the Nylon 6 were prepared in a mixture of two solvents: acetic acid and formic acid, present in weight ratio 2:1. To generate fibers of approximately 120 nm in diameter, an 11% wt. solution of Nylon 6 was prepared, to generate fibers of about 160 nm in diameter a 12.4% wt. solution of Nylon 6 was prepared, and to generate fibers of about 200 nm in diameter, a 13.7% wt. solution was prepared. The solutions were prepared by vigorously stirring each mixture of solvents and polymer in a glass reactor for 5 to 6 hours at 80° C. The solutions were subsequently cooled to room temperature.

In Example 1, nylon nanofiber mats are made from nanofibers having two different fiber diameter sizes produced by electrospinning, wherein (1) the first mat is approximately 20 µm thick and contains nanofibers having a fiber diameter approximately 120 nm, and designed to retain the bacteria *b. diminuta*, and (2) the second mat is also approximately 20 µm thick, and contains nanofibers having a fiber diameter approximately 200 nm, wherein the second mat has a proportionally higher pore size than the first mat.

The second mat can function as a prefilter layer for the 120 nm diameter fiber containing first mat.

One set of filtration devices were prepared such that the 200 nm fiber diameter containing second mat was layered directly over the 120 nm diameter fiber containing first mat, in an OptiScale 25 capsule format (EMD Millipore Corporation, Billerica, MA). OptiScale 25 capsule devices contain membrane discs having a nominal 25 mm diameter and contain 3.5 cm² of frontal surface area.

A second set of filtration devices were prepared such that a polypropylene nonwoven interlayer having fiber diameter in the range of 5 µm to 10 µm was inserted in between the 200 nm diameter fiber containing second mat and 120 nm diameter fiber containing first mat.

Each of these filter arrangements were then challenged with a stream consisting of 2 g/l EMD soy (cell culture media) in water filtered through a 0.45 µm rated membrane, operated at 2 psig.

Figure 2:
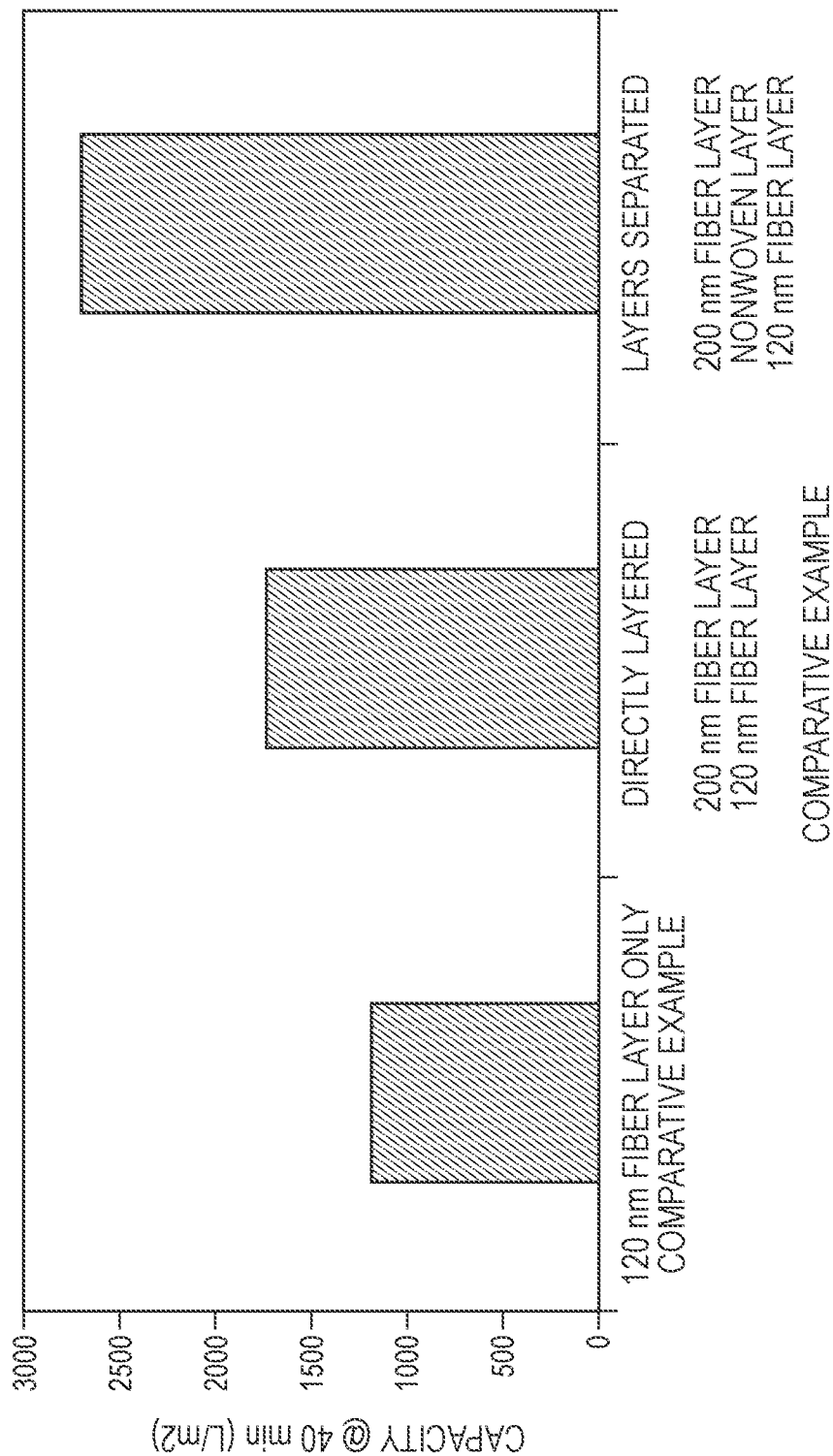
FIG. 2 is a bar graph showing the effect of the filter layer arrangement and the presence or absence of an interlayer on throughput capacity of a filter device in accordance with certain embodiments.
Figure 3:
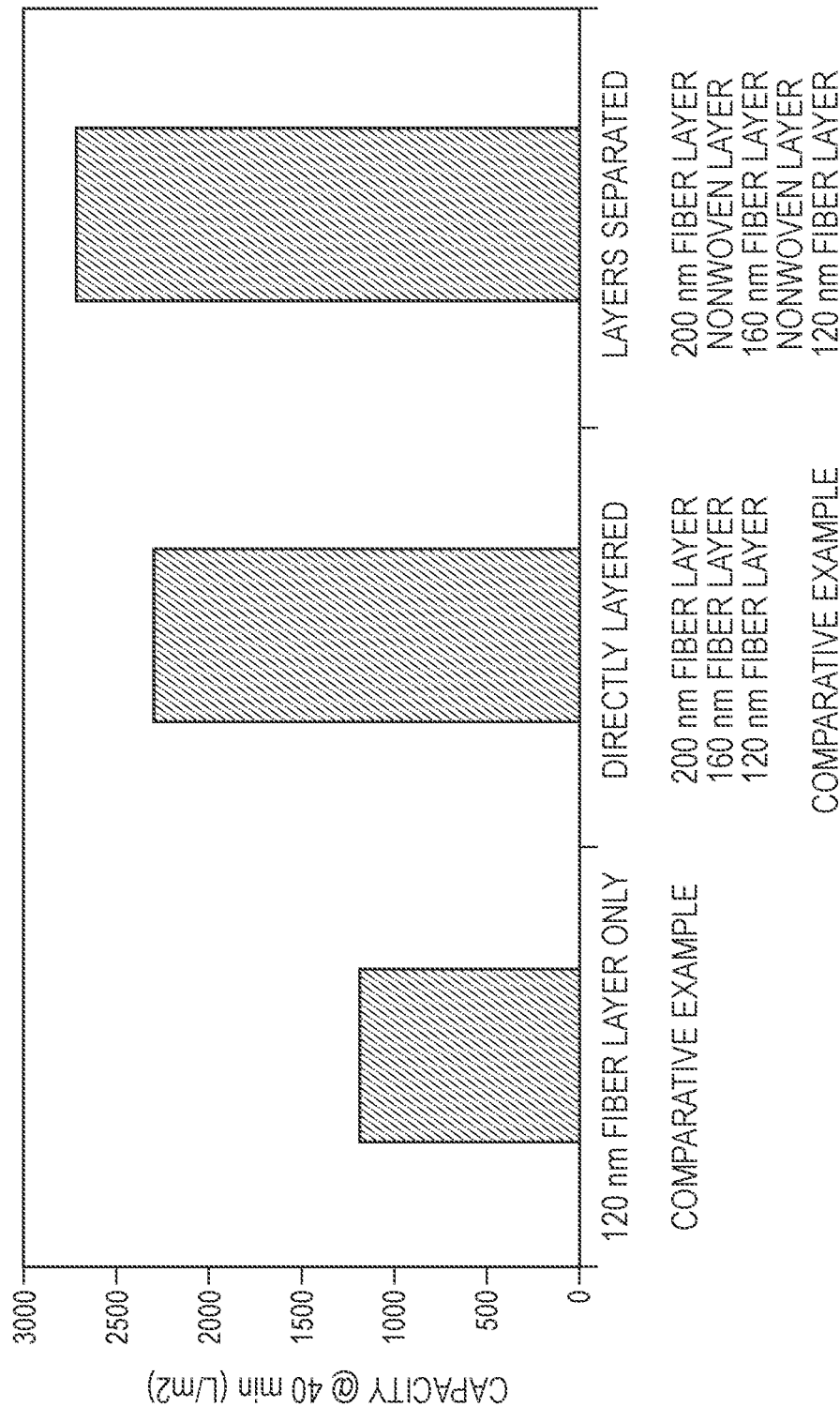
FIG. 3 is a bar graph showing the effect of the filter layer arrangement and the presence or absence of an interlayer on throughput capacity of a filter device in accordance with certain embodiments.

FIG. 2 illustrates that a filter arrangement having a porous second mat containing nanofibers having a fiber diameter of approximately 200 nm layered directly on a porous first mat containing nanofibers having a fiber diameter of approximately 120 nm achieved a higher throughput capacity when compared to a filter arrangement having a single porous mat containing nanofibers having a fiber diameter of approximately 120 nm. However, it was surprisingly discovered that a filtration structure containing a coarse nonwoven interlayer located between the porous nanofiber mat containing fibers having diameter of approximately 200 nm and the porous nanofiber mat containing fibers having a diameter of approximately 120 nm exhibited a throughput capacity higher than either one of the first two filter arrangements.

Example 2 further demonstrates the advantage of including a coarse porous interlayer between two filter layers where, in addition to the mats containing fibers having diameters of approximately 120 nm and 200 nm of Example 1, an additional nanofiber containing mat was generated approximately 20 microns thick containing fibers having a diameter of approximately 160 nm. This additional nanofiber containing mat was placed in between the 120 nm fiber containing mat and 200 nm fiber containing mat.

FIG. 2 illustrates a first set of filtration devices wherein the nanofiber containing mats were layered directly over each other. For the second set of filtration devices, a coarse polypropylene nonwoven layer having an approximate fiber diameter of about 5 µm to 10 µm was placed in between the 120 nm fiber containing mat and 160 nm fiber containing mat, and the 160 nm fiber containing mat and 200 nm fiber containing mat. As in Example 1, all the filter structures were placed into OptiScale 25 capsules.

As in Example 1, the graded fiber structures outperformed the single layer structures. Furthermore, the structures containing the nonwoven coarse interlayers outperformed the structures where the nanofiber mats were layered directly against each other.

Asymmetric or graded pore structure filters allow for improved throughput capacity compared to symmetric structures. It was surprising that adding a porous support in between nanofiber layers of different fiber sizes further enhances the capacity benefit of the asymmetric structure.

Example 3 also demonstrates the advantage of including a coarse porous interlayer in between two filtration layers. The three nanofiber layers described in Example 2 are arranged such that a nylon nonwoven interlayer about 75 µm thick and consisting of fibers having a fiber diameter of about 15 µm to 20 µm is placed adjacent to the 160 nm nanofiber layer. In another variant, the nylon nonwoven interlayer is placed only between the 160 nm and 120 nm nanofiber layers, and the 200 nm nanofiber layer was placed adjacent to the 160 nm nanofiber layer.

The throughput capacity of these two filtration structures were measured as described in Example 1, and compared to the filtration structure where no nonwoven interlayer was present (i.e., the three nanofiber layers are adjacent to each other), and the filtration structure containing, and placed between the 160 nm and 120 nm nanofiber layers.

Figure 4:
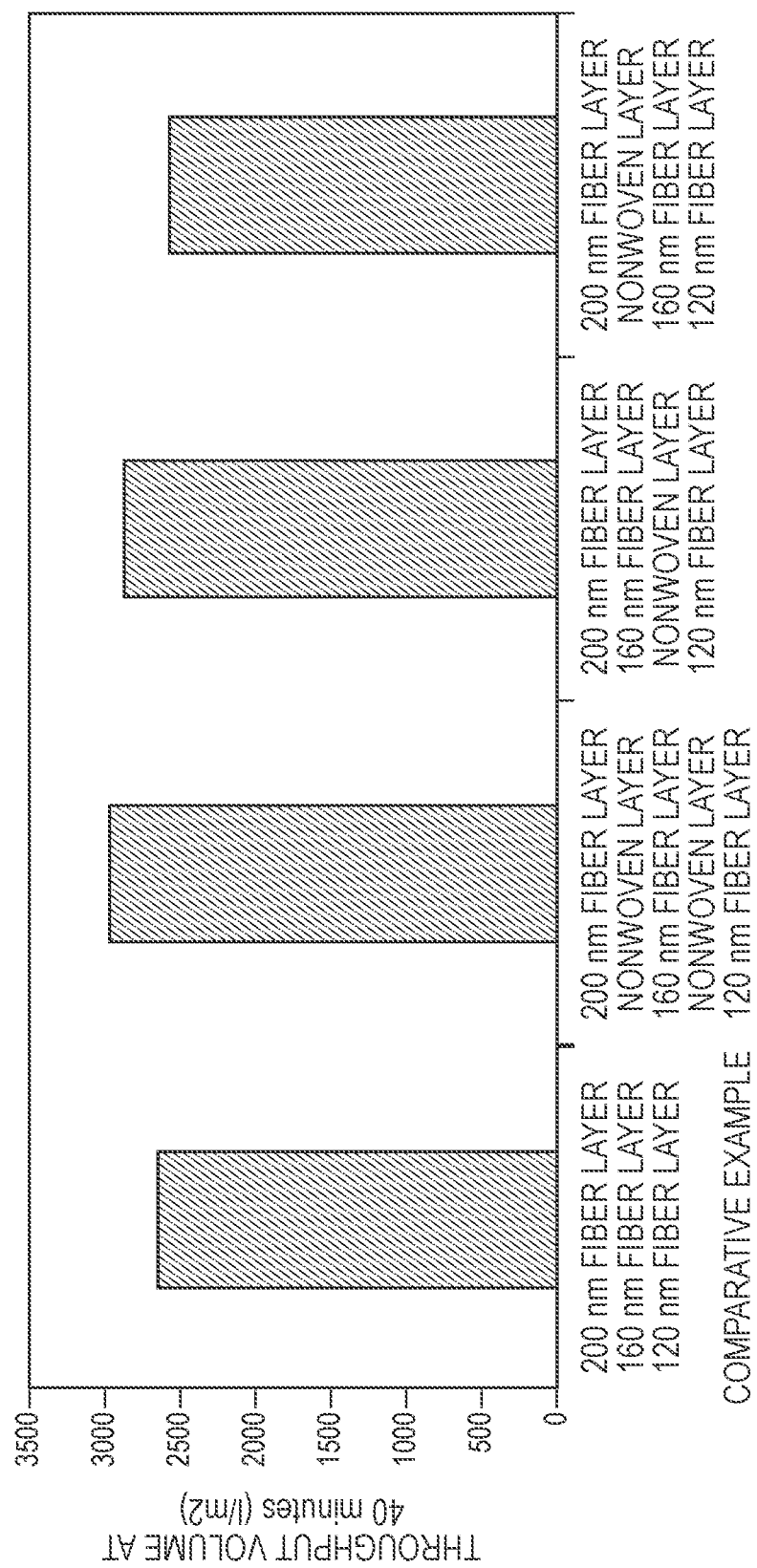
FIG. 4 is a bar graph of showing the effect of the filter layer arrangement and the presence or absence of an interlayer on throughput capacity of a filter device in accordance with certain embodiments.

FIG. 4 illustrates that the highest performing composite media filter structure had a nonwoven interlayer placed between both the 200 nm and 160 nm nanofiber containing layer and the 160 nm and 120 nm nanofiber containing layer. The composite media filter structure having the nonwoven interlayer placed only between the 200 nm and 160 nm nanofiber containing layers exhibited a capacity performance intermediate to the filter structure without any nonwoven layers and the structure with two nonwoven layers. The dirt holding capacity performance of the filter structure where the nylon nonwoven interlayer was placed only between the 160 nm and 120 nm nanofiber containing layers was not significantly different than the filter structure without any nonwoven interlayer.

Example 4 demonstrates the advantage of including a coarse porous interlayer in between two filtration layers that are designed for retention of mycoplasma and retroviruses. Nanofiber mats consisting of 70 nm nanofibers have pore sizes capable of retaining mycoplasma, and nanofiber mats consisting of 40 nm fibers have pore sizes capable of retaining retroviruses. Nanofiber mats of 70 nm and 40 nm were joined to the three nanofiber layer structure described in example 3. In one variant, a nylon nonwoven interlayer about 75 µm thick and consisting of fibers having a fiber diameter of about 15 µm to 20 µm was placed between the 70 nm and 40 nm nanofiber layers. In a second variant the 70 nm and 40 nm fiber layers did not have an interlayer between them.

Figure 5:
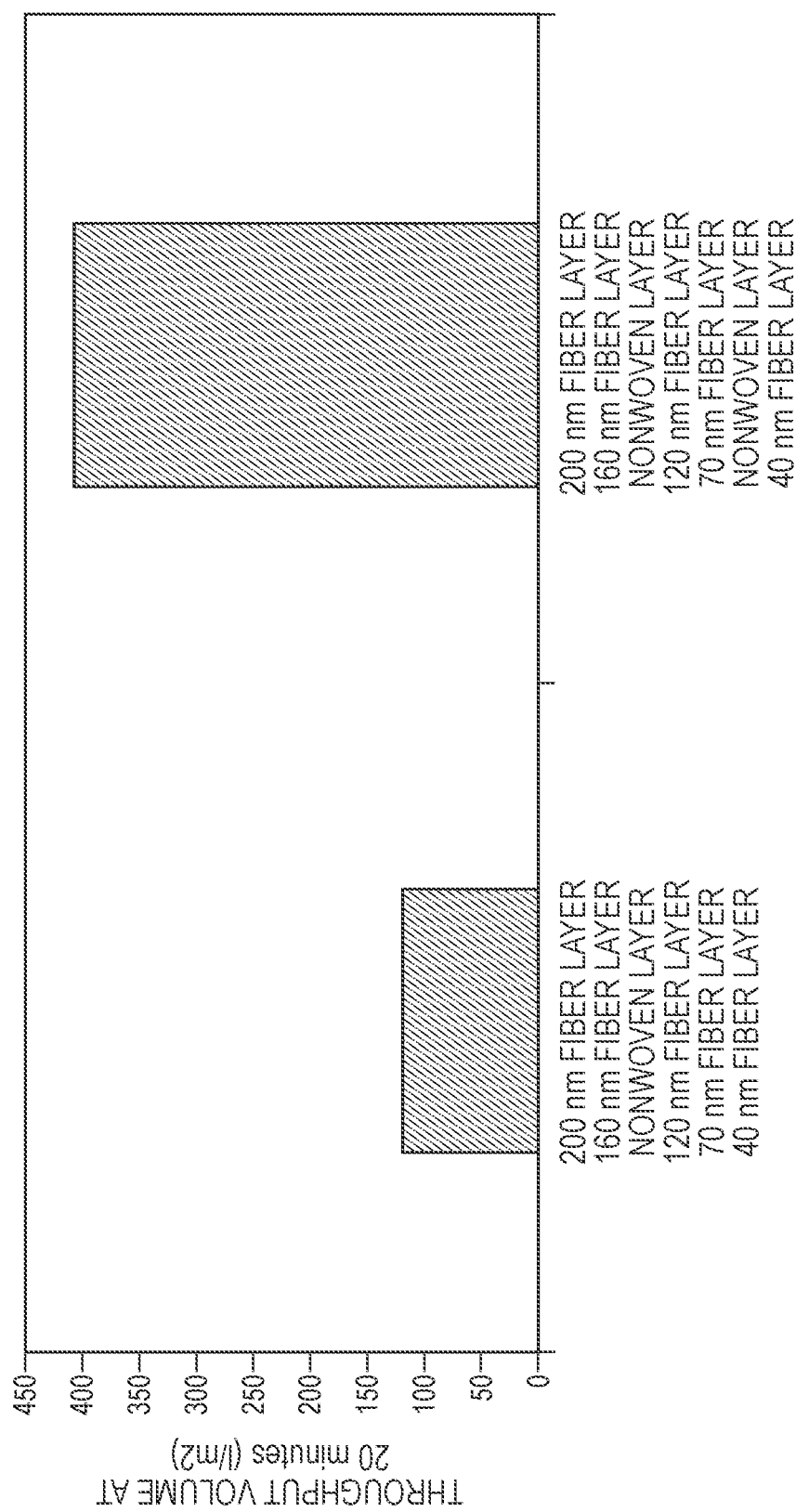
FIG. 5 is a bar graph of showing the effect of the filter layer arrangement and the presence of an interlayer on throughput capacity of a filter device in accordance with certain embodiments.

The throughput capacity of these two filtration structures were measured as described in Example 1. FIG. 5 illustrates that the composite media filter structure containing a nonwoven interlayer placed between both the 70 nm and 40 nm nanofiber containing layer exhibited a capacity performance superior to the filter structure without any nonwoven layers between the 70 and 40 nm nanofiber layers.

Methods of Use

In certain embodiments the invention may be used for filtering, separating, preparing, identifying, detecting, and/or purifying liquid biopharmaceutical preparation samples of interest from liquid samples.

In other embodiments, the present invention can be used with sample preparation methods including, but not limited to, chromatography; high pressure liquid chromatography (HPLC); electrophoresis; gel filtration; sample centrifugation; on-line sample preparation; diagnostic kits testing; diagnostic testing; transport of chemicals; transport of biomolecules; high throughput screening; affinity binding assays; purification of a liquid sample; size-based separation of the components of the fluid sample; physical properties based separation of the components of the fluid sample; chemical properties based separation of the components of the fluid sample; biological properties based separation of the components of the fluid sample; electrostatic properties based separation of the components of the fluid sample; and, combinations thereof.

Conventional processes for protein production often involve cell culture methods in which mammalian or bacterial cell lines are recombinantly engineered to produce the protein of interest. Filters can be used to reduce bioreactor contamination by microorganisms such as bacteria, fungi, mycoplasma, and viruses. For example, nanofiber membranes that include a mat of nanofibers of 120 nm in diameter are suitable for the removal of bacteria of genus *Brevendumonas diminuta*. Nanofiber membranes that include a mat of nanofibers of 70 nm in diameter are suitable of the removal of mycoplasma, principally of the genus *Acholeplasma laidlawii*.

The growth of cells in bioreactors is aided by the use of cell culture media, which contain pools of proteins, amino acids, and additives. These additives can clog the filter as they become trapped in the filter medium, closing fluid pathways, and thereby limiting the life of the filter. As described in example 1, EMD soy is a cell culture media that can clog the bacterial retentive layer in a nanofiber filter. Therefore, while filters that remove bacteria or mycoplasma can be used to filter the media, they may have a limited life due to the described clogging phenomenon. A filter employing the embodiments of this invention, in which a prefilter layer and a nonwoven interlayer is placed upstream of the bacterially retentive nanofiber layer for example, can be used to filter this media and will have a longer life compared to filters made using the prior art.

All references, including publications, patent applications, and patents, cited herein are hereby incorporated by reference to the same extent as if each reference were individually and specifically indicated to be incorporated by reference and were set forth in its entirety herein.

Preferred embodiments of this invention are described herein, include the best mode known to the inventors for carrying out the invention. Of course variations of the preferred embodiments will become apparent to those of ordinary skill in the art upon reading the foregoing description. The inventors expect skilled artisans to employ such variations as appropriate, and the inventors intend for the invention to be practiced other than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible.

What is claimed is:

1. A fluid filtration device comprising:
   (a) a holder comprising an inlet and a filtrate outlet; and
   (b) a composite media located in the holder such that the composite media separates the holder into an upstream compartment and a downstream compartment, the composite media comprising:
   (i) a first porous interlayer having opposing first and second sides,
   (ii) a first fiber containing filter layer located on the first side of the first porous interlayer; and
   (iii) a second fiber containing filter layer located on the second side of the first porous interlayer,
   (iv) a second porous interlayer having opposing first and second sides, the first side adjacent to the second fiber containing filter layer,
   (v) a third fiber containing filter layer located on the second side of the second porous interlayer,
   wherein the fibers in the first, second and third fiber containing filter layers have a different fiber diameter, and the first, second and third fiber containing filter layers have a different pore size rating, and the first and second porous interlayers have a coarser pore size than the first, second and third fiber containing filter layers.

2. The fluid filtration device according to claim 1, wherein the fibers in the first, second and third fiber containing filter layers are a polymer material selected from the group consisting of thermoplastic polymers and thermoset polymers.

3. The fluid filtration device according to claim 2, wherein the fibers in the first, second and third fiber containing filter layers are nanofibers.

4. The fluid filtration device according to claim 1, wherein the first and second porous interlayers comprise a nonwoven.

5. The fluid filtration device according to claim 4, wherein the nonwoven comprises a polymeric nanofiber.

6. The fluid filtration device according to claim 5, wherein the polymeric nanofiber is made from polypropylene.

7. The fluid filtration device according to claim 3, wherein the nanofibers in the first fiber containing filter layer have a fiber diameter from about 10 nm to about 1,000 nm, and the nanofibers in the second fiber containing filter layer have a fiber diameter from about 10 nm to about 1,000 nm.

8. The fluid filtration device according to claim 1, wherein the first, second and third fiber containing filter layers comprise electrospun mats comprising nanofiber.

9. The fluid filtration device according to claim 8, wherein the nanofiber is a polymer material selected from the group consisting of thermoplastic polymers and thermoset polymers.

10. The fluid filtration device according to claim 8, wherein the nanofiber is a polymer material selected from the group consisting of thermoplastic polymers, thermoset polymers, nylon, polyimide, aliphatic polyamide, aromatic polyamide, polysulfone, cellulose, cellulose acetate, polyether sulfone, polyurethane, poly(urea urethane), polybenzimidazole, polyetherimide, polyacrylonitrile, poly(ethylene terephthalate), polypropylene, polyaniline, poly(ethylene oxide), poly(ethylene naphthalate), poly(butylene terephthalate), styrene butadiene rubber, polystyrene, poly(vinyl chloride), poly(vinyl alcohol), poly(vinyl acetate), poly(vinylidene fluoride), poly(vinyl butylene), copolymers and combinations thereof.

11. The fluid filtration device according to claim 8, wherein the nanofiber is a polymer material selected from the group consisting of nylon-6, nylon-6,6, nylon 6, 6-6, 10, nylon-6 copolymers, nylon-6,6 copolymers, nylon 6,6-6, 10 copolymers and mixtures thereof.

12. The fluid filtration device of claim 1, wherein the first fiber containing filter layer has a thickness from about 1 μm to about 1,000 μm, the second fiber containing filter layer has a thickness from about 1 μm to about 1,000 μm and the third fiber containing filter layer has a thickness from about 1 μm to about 1,000 μm.

13. The fluid filtration device of claim 1, wherein the first, second and third fiber containing filter layers are selected from the group consisting of a gridded filter, disc shaped filter, pleated filter, depth filter and combinations thereof.

14. The fluid filtration device of claim 1, wherein the first and second porous interlayers have a mean pore size approximately 2 to 100 times larger than a mean pore size of the fiber containing first, second and third fiber containing filter layers on either side of the porous interlayers.

15. The fluid filtration device of claim 1, wherein the pore size rating of the first, second and third fiber containing layers and the pore size of the first and second interlayers is determined using one or more of the techniques selected from bubble point, liquid-liquid porometry and a challenge test with particles of known sizes.

* * * * *